United States Patent
Kogan et al.

(10) Patent No.: US 10,346,196 B2
(45) Date of Patent: Jul. 9, 2019

(54) TECHNIQUES FOR ENHANCING PROGRESS FOR HARDWARE TRANSACTIONAL MEMORY

(71) Applicant: Oracle International Corporation, Redwood City, CA (US)

(72) Inventors: Alex Kogan, Needham, MA (US); David Dice, Foxboro, MA (US); Maurice P. Herlihy, Brookline, MA (US)

(73) Assignee: Oracle International Corporation, Redwood City, CA (US)

(*) Notice: Subject to any disclaimer, the term of this patent is extended or adjusted under 35 U.S.C. 154(b) by 157 days.

(21) Appl. No.: 15/221,428

(22) Filed: Jul. 27, 2016

(65) Prior Publication Data

US 2017/0046182 A1    Feb. 16, 2017

Related U.S. Application Data

(60) Provisional application No. 62/203,829, filed on Aug. 11, 2015.

(51) Int. Cl.
*G06F 9/46* (2006.01)
*G06F 9/445* (2018.01)
(Continued)

(52) U.S. Cl.
CPC ............. *G06F 9/466* (2013.01); *G06F 8/458* (2013.01); *G06F 9/3836* (2013.01);
(Continued)

(58) Field of Classification Search
CPC . G06F 9/46; G06F 9/466; G06F 9/467; G06F 9/48; G06F 9/4806; G06F 9/4812;
(Continued)

(56) References Cited

U.S. PATENT DOCUMENTS

2009/0300017 A1* 12/2009 Tokusho ............... G06F 9/52
2010/0138841 A1*  6/2010 Dice ................. G06F 9/466
                                                          718/107
(Continued)

OTHER PUBLICATIONS

Yamada et al, "Priority-Based Conflict Resolution for Hardware Transactional Memory", 2014, IEEE, pp. 433-439.*
(Continued)

*Primary Examiner* — Charles M Swift
(74) *Attorney, Agent, or Firm* — Robert C. Kowert; Meyertons, Hood, Kivlin, Kowert & Goetzel, P.C.

(57) ABSTRACT

Hardware transactional memory (HTM) systems may guarantee that transactions commit without falling back to non-speculative code paths. A transaction that fails to progress may enter a power mode, giving the transaction priority when it conflicts with non-power-mode transactions. If, during execution of a power-mode transaction, another thread attempts, using a non-power-mode transaction, to access a shared resource being accessed by the power-mode transaction, it may be determined whether any actual data conflict occurs between the two transactions. If no data conflict exists, both transactions may continue to completion. If, however, a data conflict does exist, the power-mode transaction may deny the other transaction access to the shared resource. HTM systems may, in some embodiments, ensure that only one power-mode transaction exists at a time. In other embodiments, multiple, concurrent, power-mode transactions may be supported while ensuring that they access disjoint data sets.

19 Claims, 16 Drawing Sheets

(51) Int. Cl.
*G06F 9/48* (2006.01)
*G06F 9/50* (2006.01)
*G06F 9/38* (2018.01)
*G06F 8/41* (2018.01)
*G06F 9/52* (2006.01)

(52) U.S. Cl.
CPC .......... *G06F 9/3842* (2013.01); *G06F 9/3851* (2013.01); *G06F 9/44552* (2013.01); *G06F 9/46* (2013.01); *G06F 9/467* (2013.01); *G06F 9/48* (2013.01); *G06F 9/485* (2013.01); *G06F 9/4806* (2013.01); *G06F 9/4812* (2013.01); *G06F 9/4831* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/52* (2013.01); *G06F 9/526* (2013.01)

(58) Field of Classification Search
CPC ...... G06F 9/4831; G06F 9/4843; G06F 9/485; G06F 9/4881; G06F 9/50; G06F 9/5005; G06F 9/5027; G06F 9/5038; G06F 9/3836; G06F 9/3842; G06F 9/3851
See application file for complete search history.

(56) References Cited

U.S. PATENT DOCUMENTS

| | | | | |
|---|---|---|---|---|
| 2010/0174840 | A1* | 7/2010 | Blainey | G06F 13/1605 710/121 |
| 2011/0209155 | A1* | 8/2011 | Giampapa | G06F 9/467 718/103 |
| 2011/0246993 | A1* | 10/2011 | Moir | G06F 9/467 718/101 |
| 2013/0198749 | A1* | 8/2013 | Giampapa | G06F 9/467 718/101 |
| 2014/0115249 | A1* | 4/2014 | Jacobi | G06F 9/30087 711/108 |
| 2014/0189693 | A1* | 7/2014 | Trumbull | G06F 9/466 718/101 |
| 2015/0242347 | A1* | 8/2015 | Bradbury | G06F 13/26 710/265 |

OTHER PUBLICATIONS

Titos et al, "Speculation-based Conflict Resolution in Hardware Trasnactional Memory", 2009, IEEE, pp. 1-12.*
Dice et al, "Adaptive Integration of Hardware and Software Lock Elision Techniques", Jun. 23-25, 2014, ACM, pp. 188-197.*
Zhao et al, "Mitigating the Mismatch between the Coherence Protocol and Conflict Detection in Hardware Transactional Memory", 2014, IEEE, pp. 605-614.*
Chi Cao Minh, et al., "STAMP: Stanford Transactional Applications for Multi-Processing", Workload Characterization, IEEE International Symposium, IISWC 2008, 2008, pp. 1-12.
Ravi Rajwar, et al., "Transactional Lock-Free Execution of Lock-Based Programs", In the Proceedings of the Tenth International Conference on Architectural Support for Programming Languages and Operating Systems (ASPLOS), Oct. 6-9, 2002, pp. 1-13.
Amy Wang, et al., "Evaluation of Blue Gene/Q Hardware Support for Transactional Memories", ACM, PACT '12, 2012, pp. 1-10.
Maurice Herlihy, et al., "Transactional Memory: Architectural Support for Lock-Free Data Structures", ACM, vol. 21, No. 2, 1993, pp. 1-12.
David Dice, et al., "Early Experience with a Commercial Hardware Transactional Memory Implementation", Sun Micorsytems, Inc. (Copyright), ACM, ASPLOS'09, Mar. 7-11, 2009, pp. 1-12.
Thomas Wang, "Integer Hash Function", Retrieved from URL: http://web.archive.org/web/20071223173210/http://www.concentric.net on Jul. 25, 2016, pp. 1-6.
Pin Zhou, et al., "iWatcher: Efficient Architectural Support for Software Debugging", ACM SIGARCH Computer Architecture News, vol. 32, No. 2, IEEE Computer Society, 2004, pp. 1-12.
Jayaram Bobba, et al., "Performance Pathologies in Hardware Transactional Memory", ACM, ISCA '07, Jun. 9-13, 2007, pp. 81-91.
Richard M. Yoo, et al., "Performance Evaluation on Intel Transactional Synchronization Extensions for High-Performance Computing", ACM, SC13, Nov. 17-21, 2013, pp. 1-11.
James R., "Transactional Synchronization in Haswell", Retrieved from URL: https://software.intel.com/en-us/blogs/2012/02/07/transactional-synchron . . . on Jul. 25, 2016, pp. 1-8.

* cited by examiner (b) 50% RemoveMin, 50% Insert (c) Insert only (a) Read only (b) 60% Find, 20% Insert, 20% Remove (c) 20% Find, 40% Insert, 40% Remove (d) kmeans (low contention)

(f) ssca2

TECHNIQUES FOR ENHANCING PROGRESS FOR HARDWARE TRANSACTIONAL MEMORY

This application claims benefit of priority of U.S. Provisional Application Ser. No. 63/203,829 titled "Hardware and Software Techniques for Guaranteeing Progress for Hardware Transactional Memory" filed Aug. 11, 2015, the content of which is incorporated by reference herein in its entirety.

BACKGROUND

Field of the Disclosure

This disclosure relates generally to concurrent programming, and more particularly to systems and methods for enhancing progress for hardware transactional memory.

Description of the Related Art

Traditionally, hardware transactional memory (HTM) supports a model of concurrent programming where the programmer specifies which code blocks should be atomic, but not how that atomicity is achieved. Transactional programming models may provide simpler code structure and better concurrency compared to traditional lock-based synchronization.

Transactional Memory™ is a concurrency control technology that enables parallel programs to perform correct data sharing between concurrent computations (e.g., "threads"). Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. Transactional memory is generally implemented either as hardware transactional memory (HTM) or as software transactional memory (STM). HTM may directly ensure that a transaction is atomic, whereas (STM) may provide an illusion that a transaction is atomic, even though in fact it may actually be executed in smaller atomic steps by underlying hardware. HTM solutions are generally faster than STM ones, but so-called "best-effort" HTM implementations may not guarantee the ability to commit any particular transaction.

An atomic code block may be called a transaction and HTM may execute such transactions speculatively. For example, with HTM, if an attempt to execute a transaction commits, that atomic code block appears to have executed instantaneously and in its entirety. However, if the transaction aborts (e.g., fails to commit) that atomic code block has no effect, and control generally passes to an abort handler. A condition code may be used to indicate why the transaction failed (to commit).

One limitation of traditional HTM systems may be that, with some exceptions, they are best-effort implementations. In other words, HTM implementations typically make no guarantee that any transaction, however small or simple, will ever commit. As a result, it is usually necessary to provide two code paths: a fast, speculative transactional path to be taken in the common case, and a slower, non-speculative (e.g., lock-based) path, to be taken if the fast path repeatedly fails. Moreover, taking the non-speculative path frequently aborts any concurrent speculative transactions, even if there is no actual data conflict between the speculative and non-speculative threads. The reduced concurrency stemming from the need to provide two code paths may be considered to somewhat dilute the advantages of HTM.

An alternative way to guarantee progress may involve allowing a thread that is not making progress to suspend the other threads and run by itself. Under a transactional lock removal approach, conflicts may be resolved using timestamps, and progress is ensured by rolling back and suspending all but the transaction with the oldest timestamp. Similar "serial-mode" techniques have been proposed for transactional memory in high-end embedded systems. However, allowing transactions to force the system into serial mode can severely restrict concurrency, and may also provide a possible denial-of-service vector.

SUMMARY

Within hardware transactional memory (HTM) systems, transactions that satisfy broad "well-formedness" conditions may be guaranteed to commit without falling back to a (possibly concurrency-restricting) non-speculative code path, according to embodiments described herein. The methods, techniques and/or mechanisms described herein may, in some embodiments, strike a balance between the efficiency provided by best-effort HTM in non-contended scenarios, the simplicity of the transactional programming model, and the usefulness of stronger progress guarantees. For instance, according to some embodiments a transaction that fails to progress may enter a power mode, which may give the transaction priority when it conflicts with regular (e.g., non-power-mode) transactions. In some embodiments, the system may ensure that there is only one power-mode transaction at a time (e.g., possibly system-wide). In other embodiments, the system may support multiple, concurrent, power-mode transactions, although care may need to be taken to ensure that the concurrently executing power-mode transactions access disjoint data sets.

For example, a thread of the multithreaded application may need to access a shared resource and may attempt to execute its critical section using a regular hardware transaction (i.e., a non-power-mode transaction). If the regular transaction fails (e.g., fails to commit), the thread and/or transaction may enter power mode and begin executing its critical section using a power-mode transaction. If, during execution of the power-mode transaction, another thread attempts to access the shared resource, it may be determined whether any actual data conflict occurs between the two transactions. If no data conflict exists (e.g., between the power-mode transaction and the other transaction), both transactions may continue execution to completion. However, if a data conflict does exist, the thread using the power-mode transaction may deny the other thread (and/or the other transaction) access to the shared resource, according to some embodiments.

Figure 1:
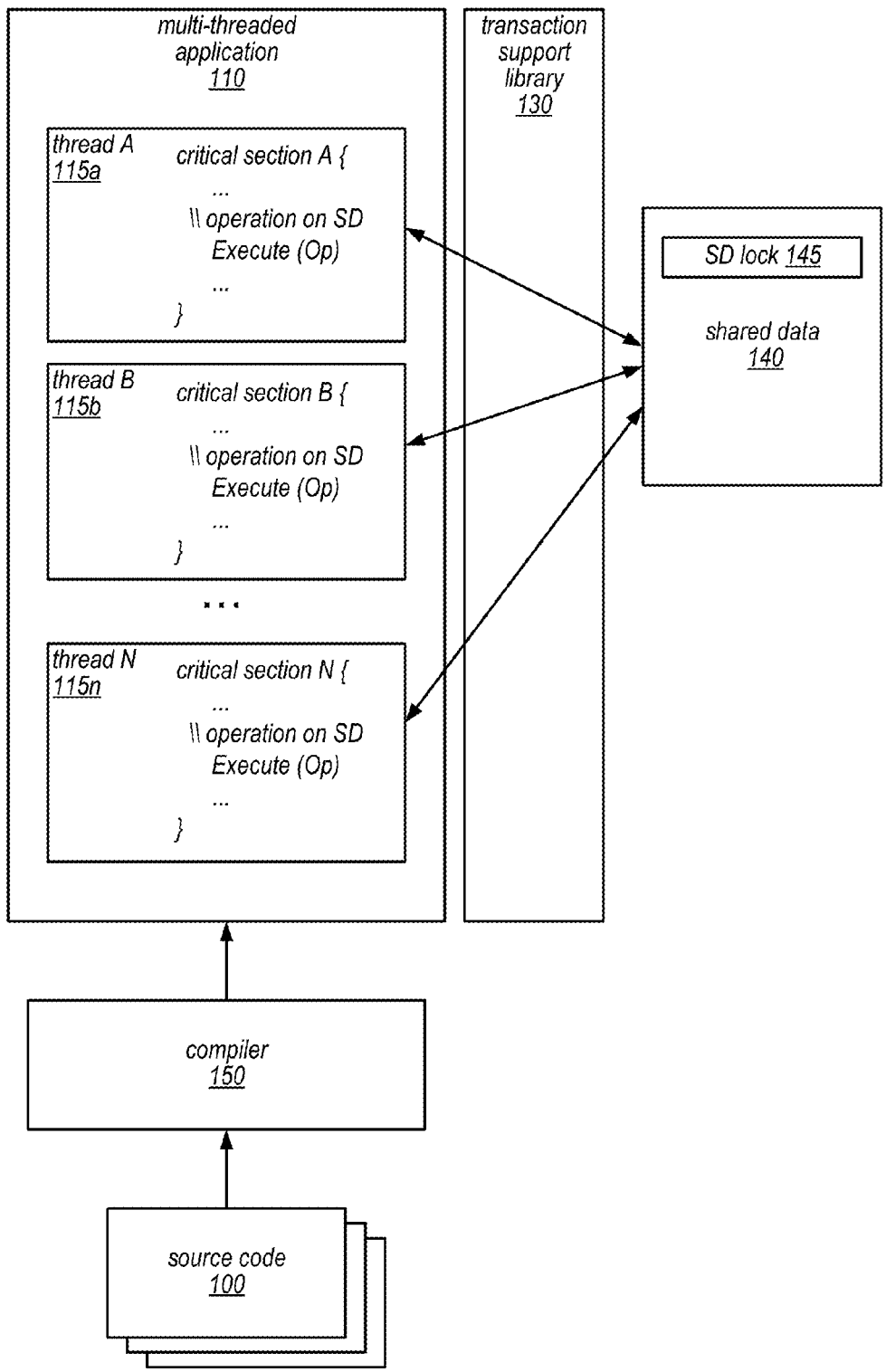
FIG. 1 is a block diagram illustrating a multi-threaded application in which multiple threads access shared data within their critical sections, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, traditional hardware transactional memory (HTM) systems, with some exceptions, do not guarantee progress: no transaction, however small or simple, is guaranteed to commit. As a result, any data structure or algorithm that uses HTM must have a non-speculative fallback path. Often, these fallback paths severely limit concurrency. In various embodiments, the systems described herein may allow HTM to make substantially stronger progress guarantees for hardware transactions while permitting higher levels of concurrency. For example, in some embodiments, systems may employ relatively simple modifications to the hardware (and corresponding software) of hardware transactional memory implementations that may allow HTM to make progress guarantees for hardware transactions. In systems that utilize the methods, techniques and/or mechanisms described herein, transactions that satisfy broad "well-formedness" conditions may be guaranteed to commit without falling back to a (possibly concurrency-restricting) non-speculative code path. In some cases, the methods, techniques and/or mechanisms described herein may be considered backward-compatible with existing HTM code, thus potentially imposing no additional cost on transactions that do not use these techniques. In some embodiments, the methods, techniques and/or mechanisms described herein may also support dynamic transactional race detection, such as including indicating when transactions whose data sets should be disjoint, are not.

Providing stronger progress guarantees may, in at least some cases, eliminate the need to provide a fallback path, thus possibly simplifying the development of efficient concurrent code. Furthermore, improving concurrency of a transactional system may ultimately translate to a higher system throughput. The methods, techniques and/or mechanisms described herein may be applicable to virtually any hardware architecture already featuring HTM or that may feature HTM in the future, according to various embodiments. In addition, in some embodiments, methods, techniques and/or mechanisms described herein may be used by software that runs on top of hardware transactional memory.

In some processors hardware transactions may be considered best-effort, such that no transaction is guaranteed to commit. Transactions executing on these processors may abort because of data conflicts, cache overflow, or cache associativity issues. Frequently, such transactions must not execute certain instructions, such as I/O instructions and system calls. Typically, progress may be guaranteed by combining HTM with some form of locking. Transactional lock elision (TLE) may be considered one of the simplest and most widely-used techniques. When utilizing TLE, a critical section associated with a lock (e.g., a critical section that accesses a shared resource, such as a shared data structure or shared data within a memory) may be attempted speculatively, such as by reading (but not writing) the lock state transactionally. If that speculation fails, the thread may acquire the lock and re-execute the critical section non-speculatively. Thus, TLE may provide progress guarantees similar to regular locking. However, TLE generally has a non-trivial cost: once the lock has been acquired, all concurrent speculative transactions will fail, even if there are no actual data conflicts.

Some HTM implementations may include non-trivial progress guarantees. For example, some HTM implementations may support constrained transactions, such that under normal conditions, the CPU may assure that constrained transactions eventually end successfully, albeit without giving a strict limit on the number of necessary retries. However, such transactions typically must satisfy a strict set of constraints, such as executing no more than 32 instructions, executing no loops or sub-routine calls, accessing no more than 4 aligned octowords of memory, etc.

Additionally, some HTM implementation may support transactional progress guarantees through a transactional memory software stack, which in turn may include a runtime system and extensions to the OS kernel and the compiler. With this approach, a transaction may enter a special irrevocable mode, such as by acquiring a special token, and execute the transaction code non-speculatively. The use of the software stack to support transactional executions, however, may come at additional cost (e.g., in terms of performance), possibly resulting, for instance, in the significant slowdown of a single thread running using HTM compared to a corresponding sequential execution.

A few hardware and hybrid (i.e., software and hardware used in conjunction) techniques have been proposed to improve performance of requester-wins HTM. One such technique is called DRW (delayed requester-wins). According to DRW, the exclusive owner of a cache line may be allowed to delay response to conflicting requests, thus potentially increasing the chance for its transaction to complete. Under DRW, delayed conflicting requests are queued at the exclusive owners' caches and are subsequently considered when the transaction ends (e.g., by commit or abort). To avoid deadlocks, DRW may associate timeouts with buffered requests and may conservatively handle a request when its timer expires. The requirement to manage the buffers of incoming conflicting requests and their associated timers may require significant substantial hardware changes. In addition, traditionally DRW does not provide any stronger progress guarantees for transactions, however small or simple.

Additionally, in some cases, fine-grained memory protection may be used to build a strongly-atomic hybrid transactional memory. Thus, transactions running using software transactional memory (STM) may be allowed to protect memory locations they are accessing (e.g., reading or writing) by setting auxiliary protection bits added to each cache line. According to fine-grained memory protection, hardware transactions, as well as non-transactional code, that attempts to access protected locations receive a protection fault, and back off or abort. Supporting fine-grained memory protection may require very intrusive architectural changes to ensure that protection bits stay associated with the data throughout the memory hierarchy. These changes may include modifying memory controllers and the OS kernel to maintain these bits, (e.g., when physical pages are swapped to and from disk). Furthermore, fine-grained memory protection is designed for hybrid transactional memory and is not directly applicable to hardware transactional memory systems. Finally, to make use of the fine-grained memory protection, every transactional access (executed by STM) may need to be instrumented and special instructions (for setting protection bits) may need to be invoked for every such access. Note that the power-mode transactions described herein may not require any of those, according to various embodiments.

Current HTM implementations may be best-effort (and do not guarantee progress) for good reason. Many (if not most) current HTM implementations piggy-back on cache coherence protocols, most of which implement a requester-wins policy. In HTM implementations implementing requester-wins policies, if one transaction requests exclusive access to a cache line that is held by another transaction, the earlier transaction aborts and restarts. As a result, repeated synchronization conflicts may prevent overall progress. Note that transactions can also be forced to abort for other reasons, including resource exhaustion, or transient conditions such as page faults or TLB misses.

The methods, techniques and/or mechanisms described herein may, in some embodiments, strike a balance between the efficiency provided by best-effort HTM in non-contended scenarios, the simplicity of the transactional programming model, and the usefulness of stronger progress guarantees. Specifically, in the systems described herein, a transaction that fails to progress may enter a new power mode, which may give it priority when it conflicts with regular transactions. As described herein, in some embodiments, this power mode may be implemented with relatively minor extensions to the core micro-architecture and coherence protocols of an existing system that implements HTM.

FIG. 1 is a block diagram illustrating a multi-threaded application in which multiple threads access shared data within their critical sections, according to one embodiment, and to which the techniques described herein may be applied. In this example, a multi-threaded application 110 may include (at least) thread A (shown as 115a), thread B (shown as 115b), and thread N (shown as 115n), individual ones of which may include a critical section that in turn may include (at least) an operation targeting a portion of shared data 140. In this example, a thread may call a function, such as the Execute(Op) function, to execute the specified operation. As described herein, according to various embodiments, an attempt may be made to execute a critical section including such an operation within a regular hardware transaction, a power-mode transaction, or the critical section may be executed under the lock associated with the shared data 140 (i.e., without using a hardware transaction). In this example, the shared data 140 may be associated with a lock 145. In some embodiments, if one or more of the critical sections are well-formed (e.g., they access a few memory words in a system where each thread has its own L1 cache with known geometry), they may be executed as power-mode transactions without the need to fall back to an alternative, lock-based path, as will be described in more detail below.

Additionally, in some embodiments, one or more attempts to execute a critical section, such as critical sections A-N of threads 115a-115n, may be performed using functions in a transaction support library 130. Transaction support library 130 may include one or more functions configured to support power-mode transactions. When attempting to execute a power-mode transaction, a thread may invoke one (or more than one) function from transaction support library 130 and that (or those) function(s) may perform various methods, techniques and/or mechanisms to implement a power-mode transaction, as described herein according to various embodiments. Furthermore, in some embodiments, transaction support library 130 may also include functions configured to support other aspects of transactions, such as to perform regular (e.g., non-power-mode) transactions. Thus, transaction support library 130 may be considered a collection of methods, functions, or other code, invocable from within a multi-threaded application, configured to support, at least, execution of critical sections using power-mode transactions, according to various embodiments. In some embodiments, transaction support library may represent a statically linked library, a dynamically linked library, a class file, an object file, or other collection of invocable functions or methods.

In at least some embodiments, the power-mode transaction support described herein may provide a lightweight mechanism for dynamic transactional race detection. As explained in more detail below, this power mode may be used to detect and flag synchronization conflicts among transactions whose data sets are expected to be disjoint, but which are not.

Power-Mode Transactions

In one example, for the purposes of explanation, it may be assumed that each hardware thread of a multithreaded application executes on a separate core (i.e., no hyper-threading), and that memory accesses performed by a hardware transaction are tracked at a per-core cache level, such as the L1 cache in some processors developed by Intel. In this example, a transaction may be considered well-formed if it would eventually commit if run in the absence of concurrent transactions. In some embodiments, only eventual commitment may be required (e.g., for a transaction to be considered well-formed) because a well-formed transaction may still require multiple commit attempts due to transient occurrences (e.g., page fault interrupts, thread context switches, etc.). In some embodiments of the systems described herein, a compiler may be able to determine (e.g., possibly statically) that a transaction can be considered well-formed (e.g., that it will eventually commit without exceeding the capacity of the L1 cache). For example, a two-word compare-and-swap function may be considered well-formed. Examples of transactions that are not well-formed may include transactions that provoke capacity aborts by overflowing the L1 cache, transactions that run for so long that they are always interrupted by context switches, transactions that execute illegal instructions, etc.

In some embodiments of the systems described herein, a thread that repeatedly fails to commit a transaction may enter power mode. Note that the term "power mode" is merely a label for referring to a form of executing transactions as described herein, while the term "power-mode" may be used herein when referring to entities or processes utilizing, or associated with a power mode (e.g., a power-mode transaction may enter power mode). In some embodiments, concurrent power-mode transactions may be allowed only if they access disjoint data sets. In some embodiments, a core executing in power mode does not invalidate transactional cache lines at the request of regular (non-power mode) transactions. As a result, a well-formed transaction executing in power mode may be guaranteed to eventually commit as long as it encounters no conflicts with other power-mode transactions (which may be considered an error in some embodiments) or with non-transactional threads.

Unlike the constrained transactions (such as those that may be supported by some IBM processors), which are distinct from regular transactions, any well-formed transaction may be run in either regular or power mode, in the systems described herein according to some embodiments. Furthermore, unlike in HTM implementations that rely on strictly constrained transactions, in at least some embodiments of the systems described herein, an attempt to execute a non-well-formed transaction in power mode will not result in a segmentation fault, but rather may abort the transaction. In some embodiments, a retry policy may inspect the transaction's condition code to decide whether to retry that transaction or take an alternative path, such as a lock acquisition path.

In some embodiments, when multiple threads share the same core (e.g., using hyper-threading, as in some Intel processors) and one of them enters power mode, an attempt by a non-power mode thread to invalidate or displace cache lines accessed by a power-mode transaction may be handled in the same way that remote requests for those lines are handled. Note that, in this example, it may be assumed that cache lines are tagged with a hyper-thread identifier, which is a feature supported in several existing architectures.

While power mode may bear a superficial similarity to conventional TLE, there are important differences between these two approaches. For instance, in conventional TLE, threads attempt to execute a critical section speculatively using HTM, and then fall back to a non-transactional lock acquisition if speculation fails. More specifically, in conventional TLE, each speculative transaction reads the lock state, thus ensuring it will be aborted if a non-speculative thread acquires the lock. In some embodiments, there may only be one thread holding the lock, and that thread, as is the case with a power-mode transaction, will not be delayed or aborted by conflicts with speculative transactions. However, one critical difference between conventional TLE and power-mode transactions described herein may be that according to conventional TLE the non-speculative thread holding the lock aborts all concurrent speculative transactions (e.g., via the conflict on the shared lock state), while a power-mode transaction described herein may only abort concurrent transactions with which it has actual data conflicts. The experimental results described below suggest that this lower conflict rate may provide non-trivial performance benefits for at least some example benchmark applications, according to some embodiments.

In some embodiments, concurrent power-mode transactions may be allowed as long as their data sets are disjoint. As described below regarding hardware support, if two concurrent power-mode transactions happen to encounter a data conflict, one transaction may be aborted. When a power-mode transaction is aborted due to a data conflict with another power-mode transaction, a special code may be used to indicate that an illegal power-mode conflict occurred. The use of this error code may provide a mechanism to detect unexpected data races between transactions. For example, in order to test whether two transactions have disjoint data sets, they may be executed concurrently in power mode. If one of them aborts with the power-mode conflict code, this may indicate that the transactions' data sets are not disjoint, and that there is a (possibly unexpected) data race.

Returning now to FIG. 1, in some embodiments, a compiler, such as compiler 150 may be configured to compile source code 100 to generate multi-threaded application 110. For example, during compilation source code 100, compiler 150 may encounter a critical section in which a thread accesses a shared resource, such as shared data 140. The compiler may determine whether the critical section can be implemented within a well-formed transaction and, if so, the compiler may include one or more calls to transaction support library 130 for invoking a regular hardware transaction and/or a power-mode transaction to execute critical section without acquiring the lock, as will be described in more detail below according to various embodiments. Additionally, when compiling source code 100, compiler 150 may also generate alternate code paths for acquiring a lock associated with a shared resource, such as SD lock 145 associated with shared data 140, and for attempting to execute a critical section using a regular hardware transaction and/or a power-mode transaction, according to some embodiments.

Figure 2:
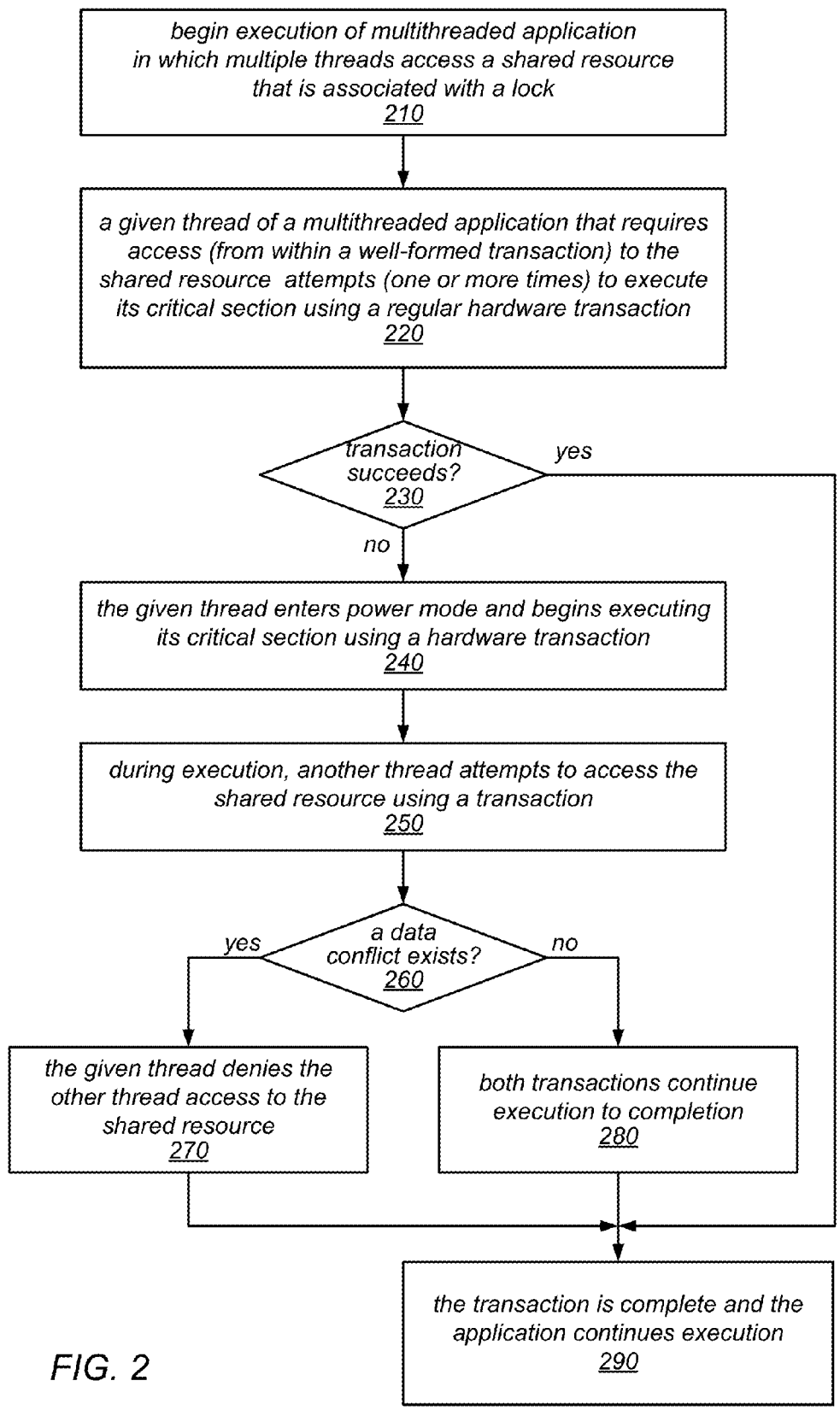
FIG. 2 is a flow diagram illustrating one embodiment of a method for utilizing a power-mode transaction in a hardware transactional memory (HTM) system.

FIG. 2 is a flow diagram illustrating one embodiment of a method for utilizing a power-mode transaction in a hardware transactional memory (HTM) system. As illustrated by block 210, execution of a multithreaded application in which multiple threads access a shared resource associated with a lock may be started. A given thread of the multithreaded application that requires access to the shared resource (within a well-formed transaction) may attempt (one or more times) to execute its critical section using a regular hardware transaction (i.e., a non-power-mode transaction), as in block 220. For example, thread 115a of multi-threaded application 110 may require access to shared data 140. If the transaction succeeds, as indicated by the positive output of decision block 230, the transaction may be considered complete and the application may continue execution, as illustrated by block 290.

If, as indicated by the negative output of decision block 230, the transaction fails to succeed, the given thread may enter power mode and begin executing its critical section using a power-mode transaction, as illustrated by block 240.

During execution, another thread attempts to access the shared resource using a transaction, as in block 250. If, as indicated by the negative output of decision block 260, no data conflict exists (e.g., between the power-mode transaction and the other transaction), no action may be taken by the given thread and both transactions may continue execution to completion, as in block 280. Alternatively, if a data conflict does exist, as indicated by the positive output of decision block 260, the given thread may deny access to the shared resource by the other thread, as in block 270. For example, in one embodiment, a thread in power mode may deny the other thread access by sending a NACK to the other thread, in response to the other thread attempting to access the shared resource. Additionally, in some embodiments, a thread in power mode may deny invalidation requests only from regular transactions, but from non-transactional code as well, thereby potentially forcing the latter to back off and request the same cache line again. Allowing a thread in power mode to deny invalidation requests from both other (e.g., regular) transactions and non-transaction code may, in some embodiments, simplify the implementation of power mode and may increase the circumstances in which the progress of power-mode transactions may be guaranteed.

Example Implementations

In some embodiments, when implementing support for power-mode transactions, a native cache coherence protocol may utilize two extensions. First, each cache invalidation request sent by a regular (e.g., non-power) transaction may be tagged as a regular (e.g., non-power-mode). Second, a power-mode transaction that receives an invalidation request from a regular transaction may refuse the invalidation, (e.g., replying with a NACK message that causes the regular transaction to abort). In some embodiments, all other aspects of a native cache coherence protocol may be unchanged. A power-mode transaction may, according to various embodiments, honor invalidation requests from other power-mode transactions (which may indicate a data race error) and/or from non-transactional threads, as will be explained in more detail below.

While described herein using particular examples, in other embodiments power-mode transactions may be involve other possible implementations. For instance, one example implementation may forgo tagging cache coherence messages as transactional or non-transactional. Instead, a transaction that receives a NACK message may simply abort, and a non-transactional thread may back off (e.g., pause) and resend its request. Such an approach may not require changing coherence message formats and may thus be considered simpler, according to some embodiments. However, in some embodiments care may need to be taken to tune the duration of such a back off, and to avoid denial-of-service vulnerabilities originating from the use of power-mode transactions.

The exact manner in which a transaction enters power mode may vary from embodiment to embodiment. For instance, two example mechanisms for switching from a regular transaction execution mode to a power-mode, according to various embodiments, are described below: a relatively easy-to-use hardware interface, and a more flexible software interface. In the first example, a relatively simple hardware-based scheme may ensure that there is only one power-mode transaction at a time (e.g., possibly system-wide). There are many ways to implement such functionality, which may require the ability to arbitrate concurrent requests. For example, in some embodiments, this approach may utilize token-passing or the functional equivalent of a test-and-set operation. Alternatively, a software-based scheme may have the advantage of potentially supporting concurrent power-mode transactions, although, as noted, care may need to be taken to ensure that they access disjoint data sets. (As described herein, the underlying hardware may be able to use the condition code to notify software of data races between concurrent power-mode transactions.)

In some embodiments, software access to power mode may be protected by a lock (e.g., a spin lock for simplicity, or a queue lock for fairness). The example pseudo-code shown below illustrates one example TLE mechanism that uses a simple test-test-set spin lock to protect the access to the power mode. More specifically, the example pseudo-code below represents one possible example lock procedure and one possible example unlock procedure that may be invoked (e.g., through calls to functions of a transaction support library) in a system that supports power-mode transactions, according to various embodiments. In the example below, a transaction may escalate to power mode if it repeatedly fails to commit using a regular-mode hardware transaction. The atomic compare-and-swap (CAS) (in line 13 of the lock procedure) may ensure that only the thread that sets the powerFlag flag to 1 will enter the power mode. By contrast within conventional TLE regular-mode transactions do not read any lock states. Like conventional TLE, in some embodiments power-mode transactions may be subject to the lemming effect, which may arise when one transaction enters power mode and forces the rest to follow. One way to mitigate the lemming effect, in some embodiments, may be to give less (or even zero) weight for retries that happen while the powerFlag flag is set. That is, if an attempt to use a regular-mode transaction fails and the powerFlag is set, this attempt may be discounted (such as by decrementing an n-trials counter, as shown on line 6 of the lock procedure). Note that, in some embodiments, a transaction may be able to query the thread-local variable myPowerFlag in order to determine whether it is currently in power mode.

```
initially : ( global ) powerFlag = 0;
           (thread local ) myPowerFlag = 0;
Lock procedure:
1  ntrials = 0;
2  while (true) {
3    // try to run using a non-power-mode transaction
4    if (begin_htm( )) return;
5    // avoid the lemming effect
6    if (powerFlag) ntrials - -;
7    // increase the counter for the number
8    // of non-power mode trials
9    if (++ ntrials >= MAX_TLE_TRIALS) {
10     // if the number of non-power mode trials is
11     // exhausted, check if the 'powerFlag' flag is
12     // available and try to set it
13     if (! powerFlag && CAS(&powerFlag, 0, 1)) break;
14   }
15 }
16 // transaction failed to commit using non-power transactions, and
17 // the 'powerFlag' flag was successfully set; run using a
     power-mode transaction
18 myPowerFlag = 1;
19 begin_power_htm( );
Unlock procedure:
1  if (myPowerFlag) {
2    commit_power_htm( );
3    powerFlag = 0;
```

```
4    myPowerFlag = 0;
5  } else {
6    commit_htm( );
7  }
```

The TLE mechanism (which uses HTM to elide a lock) illustrated in the example pseudo-code above may not include a non-transactional (lock-based) fallback path. While the methods, techniques and/or mechanisms described herein may be suitable for transactions that are known to be well-formed (which, as described herein, may be identified by the compiler), in other embodiments, this mechanism may also be extended to support a lock-based fallback path. In such embodiments, even if it is not known whether the transaction meets the well-formedness criteria, the locking path may be taken when and if the regular and power-mode transactions fail.

Figure 3:
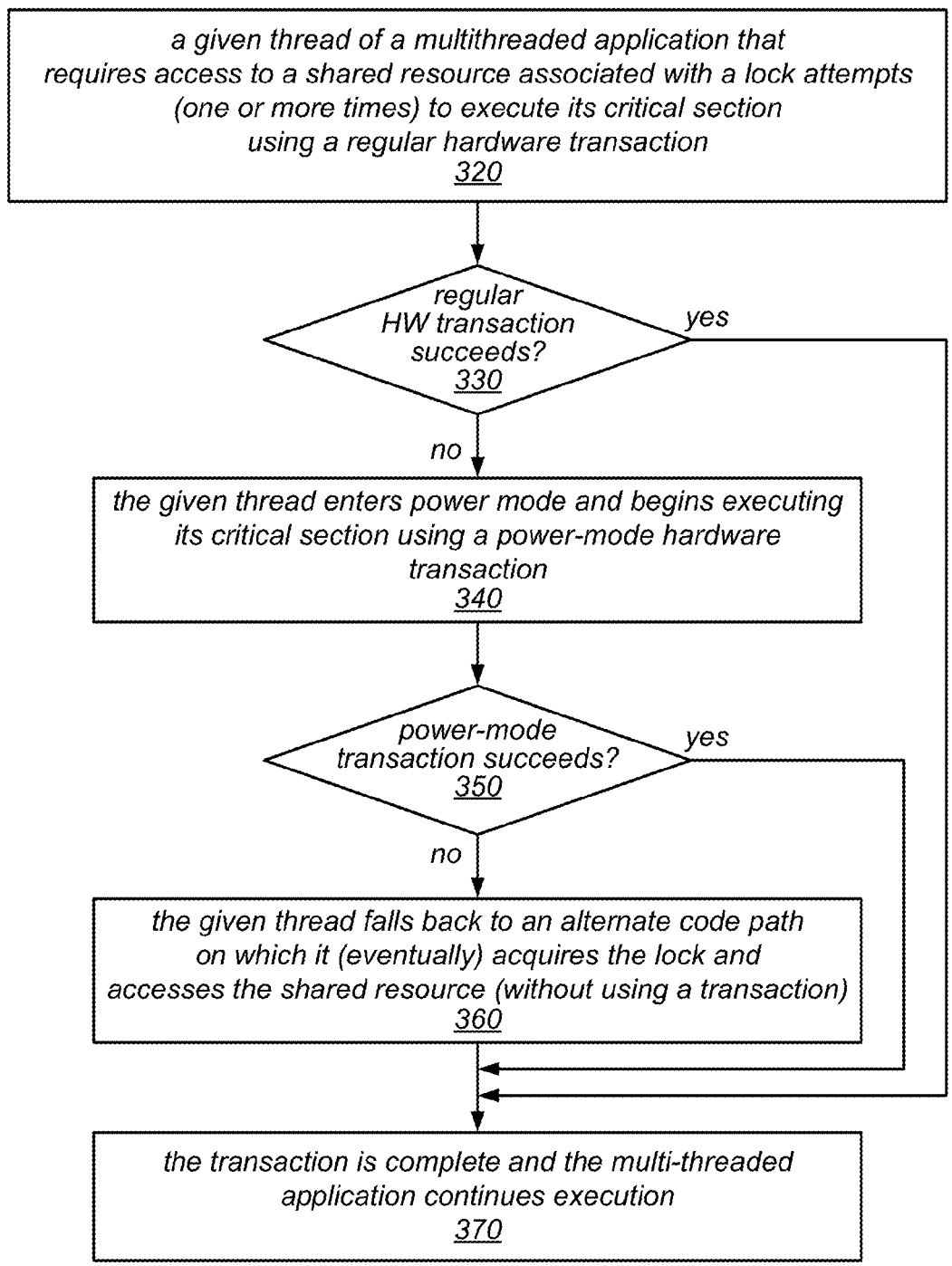
FIG. 3 is a flow diagram illustrating one embodiment of a method for utilizing a power-mode transaction that has a fallback path in a hardware transactional memory (HTM) system.

FIG. 3 is a flow diagram illustrating one embodiment of a method for utilizing a power-mode transaction that has a fallback path in a hardware transactional memory (HTM) system. A thread of a multithreaded application, such as thread 115a of multithreaded application 110, that requires access to a shared resource associated with a lock, such as shared data 140, may attempt (one or more times) to execute its critical section using a regular (i.e., non-power-mode) transaction, as in block 320. If, as indicated by the positive output of decision block 330, the regular HW transaction succeeds, the transaction may be considered complete and the multi-threaded application may continue execution as appropriate, as in block 370.

Alternatively, as indicated by the negative output of decision block 330, the regular HW transaction does not succeed, the given thread may enter power mode and begin executing its critical section using a power-mode transaction, as in block 340. Further, if as indicated by the negative output of decision block 350, the power-mode transaction does not succeed, the given thread may fall back to an alternative code path on which it (eventually) acquires the lock and accesses the shared resource without using a transaction, as in block 360.

Figure 4:
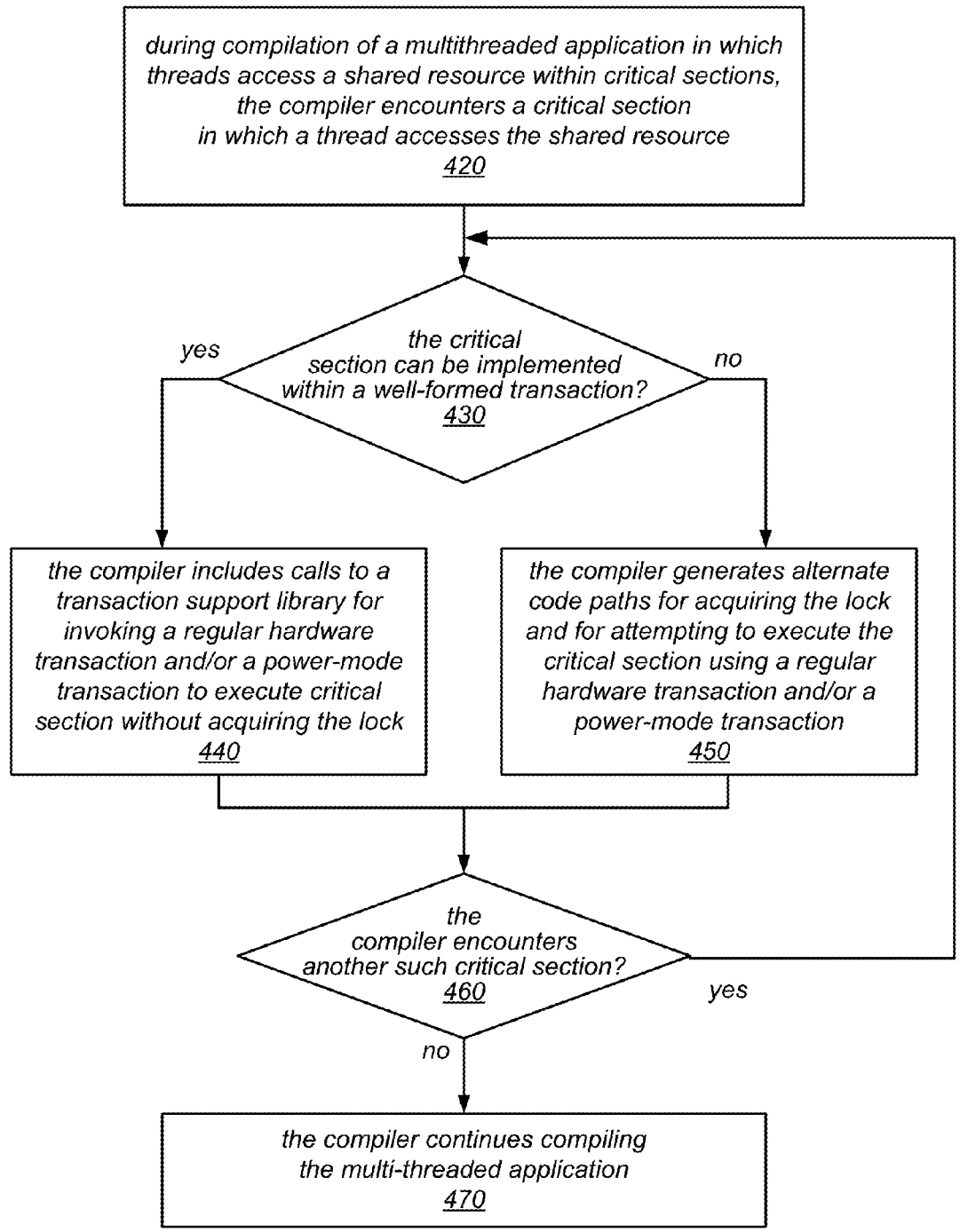
FIG. 4 is a flow diagram illustrating one embodiment of a method for determining which, if any, critical sections of code may be executed using power-mode transactions.

FIG. 4 is a flow diagram illustrating one embodiment of a method for determining which, if any critical sections of code may be executed using power-mode transactions. As shown in block 420, during compilation of a multithreaded application in which threads access a shared resource within critical sections the compiler may encounter a critical section in which a thread accesses the shared resource. For example, compiler 150 may be compiling source code 100 and may encounter a critical section in the source code, such as code corresponding to the critical section A in thread A of FIG. 1. The compiler 150 may determine whether the critical section can be implemented within a well-formed transaction. If the critical section can be implemented within a well-formed transaction, as indicated by the positive output of decision block 430, compiler 150 may include one or more calls to a transaction support library, such as transaction support library 130, for invoking a regular hardware transaction and/or a power-mode transaction to execute critical section without acquiring the lock, as in block 440.

Alternatively, if the critical section cannot be implemented within a well-formed transaction, as indicated by the negative output of decision block 430, the compiler 150 may generate alternate code paths for acquiring the lock and for attempting to execute the critical section using a regular hardware transaction and/or a power-mode transaction, as in block 450. In some embodiments, compiler 150 may, as part of generating alternate code paths, include one or more calls to transaction support library 130. Thus, in some embodiments, transaction support library may include support for various mechanisms (e.g., power-mode transactions, regular transaction, lock acquisition, etc.) for accessing shared resources from within critical sections of multi-threaded applications.

If the compiler encounters another critical section in which a thread accesses the shared resource, as indicated by the positive output of decision block 460, the compiler may then analyze that critical section as indicated by return to decision block 430. Alternatively, if the compiler does not encounter another critical section in which a thread accesses the shared resource, as indicated by the negative output of decision block 460, the compiler may continue compiling the multi-threaded application, as in block 470.

Figure 5:
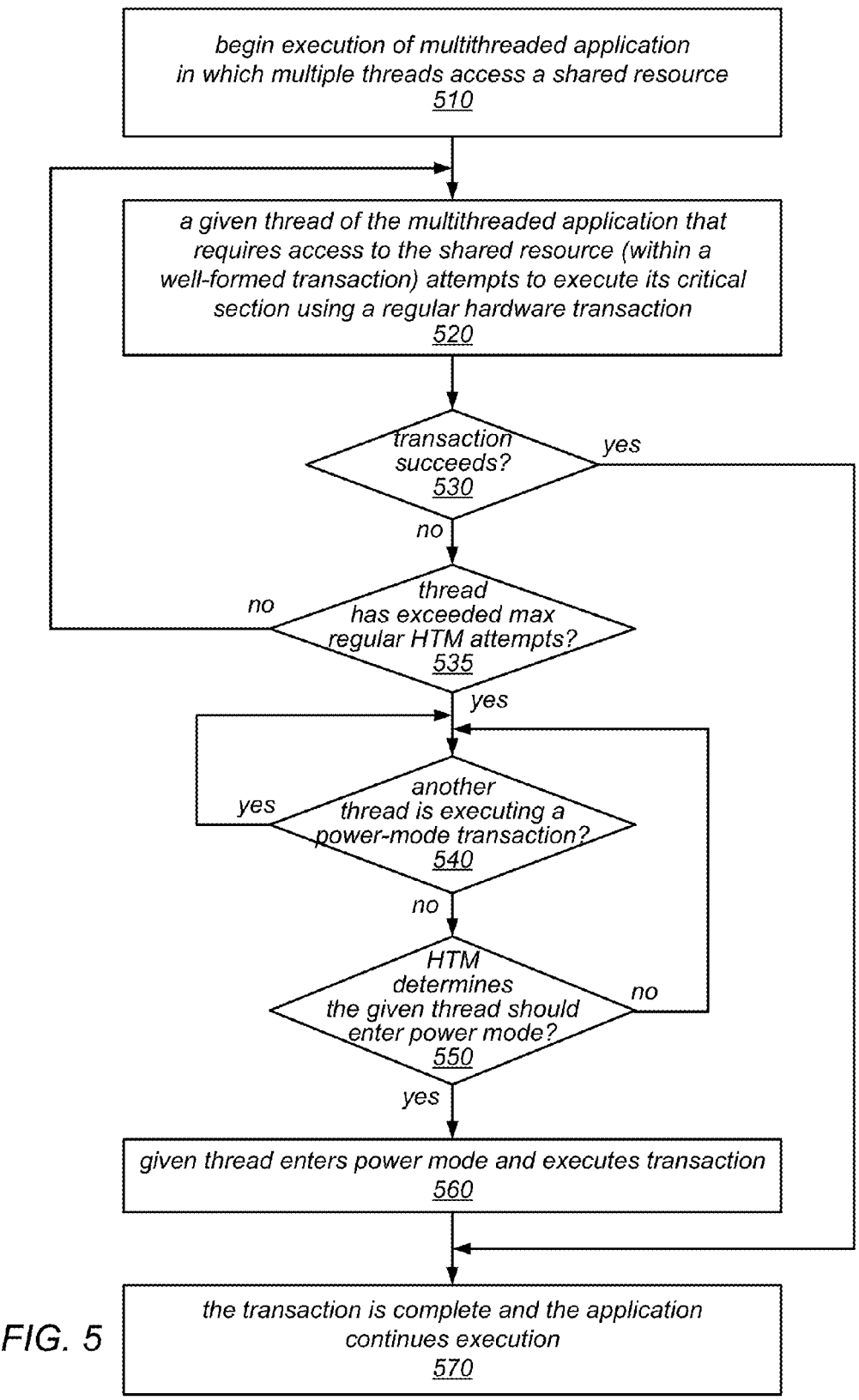
FIG. 5 is a flow diagram illustrating one embodiment of a method for controlling a thread's entry into power mode using hardware within an HTM system.

FIG. 5 is a flow diagram illustrating one embodiment of a method for controlling a thread's entry into power mode using hardware within an HTM system. As in block 510, execution of a multithreaded application in which multiple threads access a shared resource may be started. A given thread of the multithreaded application that requires access to the shared resource (within a well-formed transaction) attempts to execute its critical section using a regular hardware transaction, as in block 520. If the transaction succeeds, as indicated by the positive output of decision block 530, the transaction may be considered complete and the application may continue execution as appropriate, as in block 570.

If the transaction does not succeed, as indicated by the negative output of decision block 530, it may then be determined whether or not the thread has exceeded a maximum number of regular HTM attempts as in decision block 535. If, as indicated by the negative output of decision block 535, the thread has not exceeded a maximum number of attempts using a regular (non-power-mode) hardware transaction, the thread may again attempt to execute its critical section using a regular hardware transaction, as shown by the arrow from decision block 535 to block 520. Alternatively, if the thread has exceeded a maximum number of regular HTM attempts, as indicated by the positive output of decision block 535, it may be determined whether another thread is currently executing a power-mode transaction, as in block 540. As noted previously, a thread may enter power mode in any of various manners, according to different embodiments.

If, as indicated by the positive output of decision block 540, another thread is executing a power-mode transaction, the current thread may wait until no other thread is executing a power-mode transaction. If (or when) no other thread is executing a power-mode transaction, as indicated by the negative output of decision block 540, the HTM may determine whether the given thread should enter power mode, as in block 550.

However, as indicated by the negative output of decision block 550, if it is determined, such as by the HTM, that the given thread should not enter power mode, the thread may again determine whether another thread is executing a power-mode transaction. Alternatively, if it is determined that the given transaction should enter power mode, as indicated by the positive output of decision block 550, the given thread may then enter power mode and execute the transaction, as in block 560.

In the example method described above regarding FIG. 5, any or all of the operations illustrated in 535-550 may be performed by (possibly dedicated) hardware in an underlying HTM system. Thus, one or more of: determining whether the thread has exceeded a maximum number of attempts to execute a critical section using a regular hardware transaction, determining whether another thread is executing a power-mode transaction and/or limiting the number of threads that can execute a power-mode transaction to one or another small number, and/or determining which, if any, thread should enter power mode when there are multiple threads wishing to access a shared resource may be performed in hardware. For example, in some embodiments, the hardware may implement a predetermined policy for passing "ownership" of a power mode around between different threads that request to enter such a mode or that otherwise meet predetermined criteria for entering a power mode (e.g., on a round robin basis or according to some type of relative priority between them). Note that any of a variety of policies for deciding when and if a thread should enter power mode may be implemented in different embodiments.

Alternatively, one or more of the operations described above regarding FIG. 5 may be performed in software. Thus, in some embodiments, one or more of determining whether the thread has exceeded a maximum number of attempts to execute a critical section using a regular hardware transaction, determining whether another thread is executing a power-mode transaction and/or limiting the number of threads that can execute a power-mode transaction to one or another small number, and/or determining which, if any, thread should enter power mode when there are multiple threads wishing to access a shared resource may be performed in software, such as by one or more functions in transaction support library 130. Additionally, the operations described above regarding FIG. 5 may be performed using a combination of hardware and software. For example, one or more of the operations may be performed in hardware, while others of the operations may be performed using software, according to various embodiments.

Figure 6:
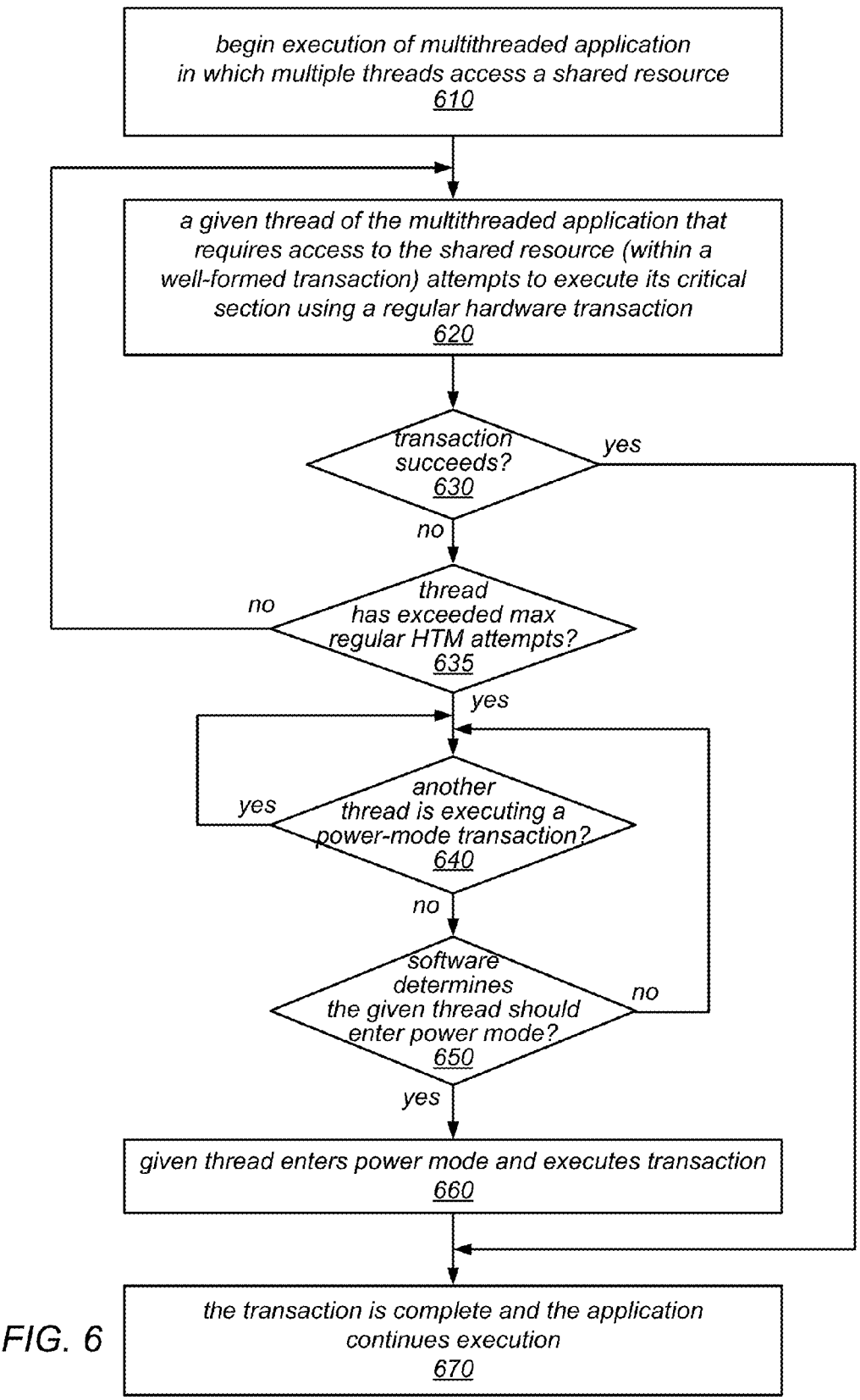
FIG. 6 is a flow diagram illustrating one embodiment of a method for controlling a thread's entry into power mode within an HTM system using software.

FIG. 6 is a flow diagram illustrating one embodiment of a method for controlling a thread's entry into power mode within an HTM system using software. As shown in block 610, a multithreaded application in which multiple threads access a shared resource may begin execution. A given thread of the multithreaded application that requires access to the shared resource (within a well-formed transaction) attempts to execute its critical section using a regular hardware transaction, as in block 620. If the transaction succeeds, as indicated by the positive output of decision block 630, the transaction may be considered complete and the application may continue execution as appropriate, as in block 670.

If the transaction does not succeed, as indicated by the negative output of decision block 630, it may then be determined whether or not the thread has exceeded a maximum number of regular HTM attempts as in decision block 635. If, as indicated by the negative output of decision block 535, the thread has not exceeded a maximum number of attempts using a regular (non-power-mode) hardware transaction, the thread may again attempt to execute its critical section using a regular hardware transaction, as shown by the arrow from decision block 635 to block 620. Alternatively, if the thread has exceeded a maximum number of regular HTM attempts, as indicated by the positive output of decision block 635, it may be determined whether another thread is currently executing a power-mode transaction, as in block 640. If, as indicated by the positive output of decision block 640, another thread is executing a power-mode transaction, the current thread may wait until no other thread is executing a power-mode transaction. If (or when) no other thread is executing a power-mode transaction, as indicated by the negative output of decision mode 640, it may be determined, such as by software managing power mode, whether the given thread should enter power mode, as in block 650.

If, as indicated by the negative output of decision block 650, it is determined, such as by the software managing power mode, that the given thread should not enter power mode, the thread may again determine whether another thread is executing a power-mode transaction. Alternatively, if it is determined that the given transaction should enter power mode, as indicated by the positive output of decision block 650, the given thread may then enter power mode and execute the transaction, as in block 660.

In the example method described above regarding FIG. 6, any or all of the operations illustrated in 635-650 (including determining whether the thread has exceeded a maximum number of attempts to execute a critical section using a regular hardware transaction, determining whether another thread is executing a power-mode transaction and/or limiting the number of threads that can execute a power-mode transaction to one or another small number, and/or determining which, if any, thread should enter power mode when there are multiple threads wishing to access a shared resource) may be performed by software executing in the system (e.g., by special functions in a transaction support library that are configured to support power-mode transactions). For example, in some embodiments, the software may implement a predetermined policy for passing "ownership" of a power mode around between different threads that request to enter such a mode or that otherwise meet predetermined criteria for entering a power mode (e.g., on a round robin basis or according to some type of relative priority between them). In one example, the software may use a flag and CAS instruction to arbitrate for power mode access. Again note that any of a variety of policies for deciding when and if a thread should enter power mode may be implemented in different embodiments.

Figure 7:
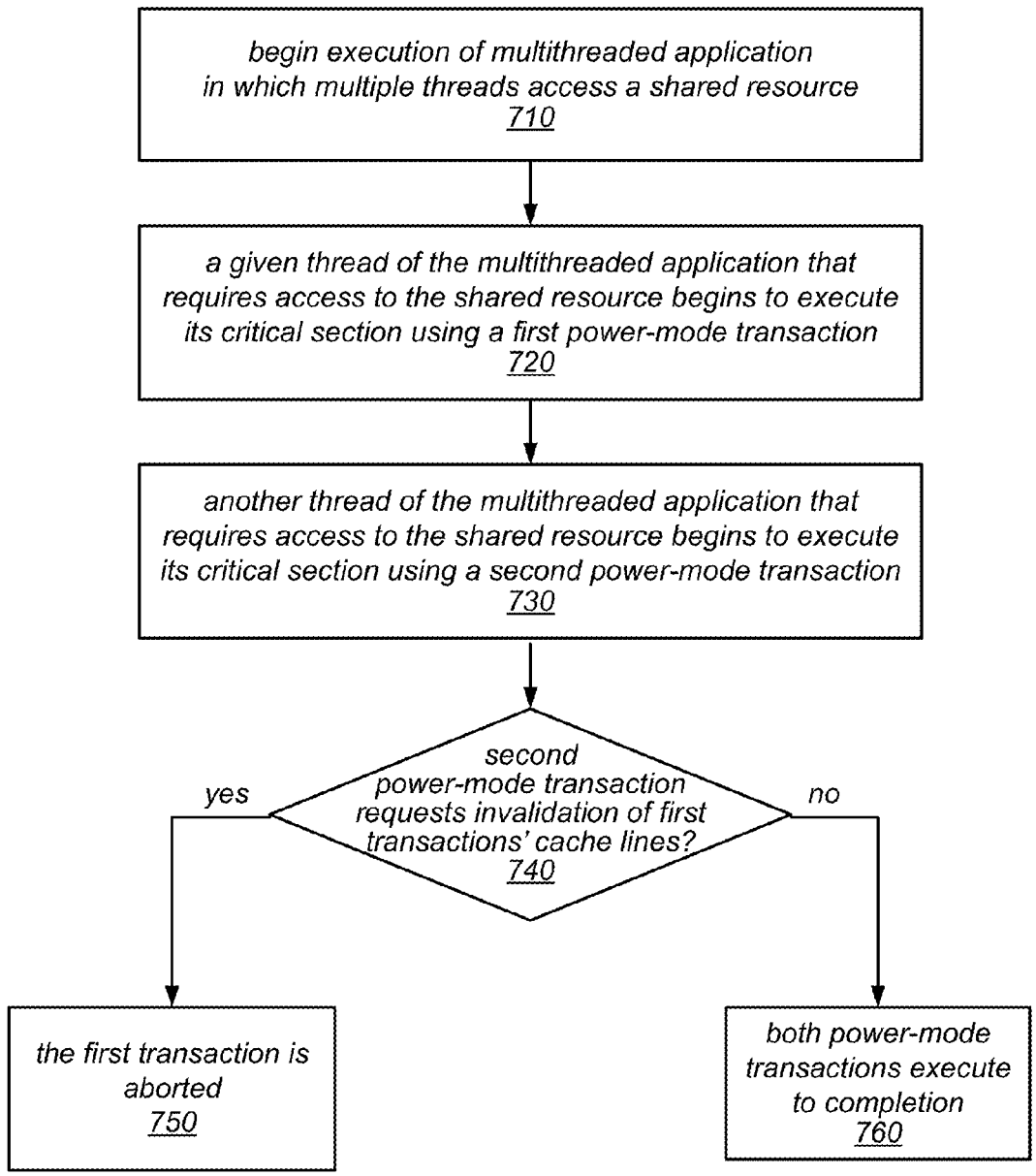
FIG. 7 is a flow diagram illustrating one embodiment of a method for detecting an illegal power-mode conflict.

FIG. 7 is a flow diagram illustrating one embodiment of a method for detecting an illegal power-mode conflict. In some embodiments, if such a conflict is detected, this may indicate that there is an unexpected data race between two threads. Once such a conflict or data race condition is detected, the application developer may modify the application code to eliminate the data race or to ensure that the conflicting transactions are not executed using concurrent power-mode transactions. As illustrated in block 710, a multithreaded application in which multiple threads access a shared resource begins execution. A given thread of the multi-threaded application that requires access to the shared resource begins to execute its critical section using a first power-mode transaction, as in block 720. Additionally, another thread of the multithreaded application that requires access to the shared resource begins to execute its critical section using a second power-mode transaction, as illustrated in block 730.

If the second power-mode transaction requests invalidation of the first transaction's cache lines, as indicated by the positive output of decision block 750, the first transaction may be aborted, as in block 750. Additionally, in some embodiments, the first transaction may be aborted using a special error code indicating that an illegal power-mode conflict (e.g., an unexpected data race) occurred. Alternatively, if the second power-mode transaction does not request invalidation of the first transaction's cache lines, as indicated by the negative output of decision block 740, both power-mode transactions may execute to completion, as indicated by block 760. While block 760 indicates that both transactions execute to completion, in some embodiments, one or both of the transactions may fail to commit for reasons other than related to conflicts (e.g., data race and/or data conflict) between the two transactions described above regarding FIG. 7.

Evaluations

Several experiments have been conducted to test the degree to which the use of power-mode transactions may improve throughput. Since no hardware implementation of power mode was available for these experiments, software "metalocks" were introduced that mimic the behavior of a hardware power mode implementation. While these metalocks may slow transactions down, they slow both power-mode transactions and regular transactions. Therefore, measuring the relative performance of these transaction types using these software metalocks may provide a way to estimate their relative performance in a hardware implementation of power mode, according to various embodiments. Since, in some embodiments, power-mode transactions (unlike regular transactions) may not be required to write each time they read, this estimation may be considered conservative, as it tends to favor the relative performance of regular transactions.

For example, the GCC compiler (e.g., from version 4.8) provides a "libitm" interface (e.g., an interface for the "libitm" runtime library) to support transactional programs. This compiler translates critical sections implemented as atomic transactions into two distinct code paths: instrumented and un-instrumented. The instrumented code path inserts calls to instrumentation barriers (e.g., functions invoked on each transactional memory access). This libitm library provides standard instrumentation barrier alternatives, such as TLE, STM, or lock synchronization, as well as the opportunity to provide customized instrumentation barriers and functions to be called when transactions commit or abort.

For these experiments, however, a custom implementation of the libitm interface was used in order to reduce instrumentation overhead. For example, the library implementing the libitm interface in GCC is dynamically linked to an executable, resulting in an expensive function call for every memory access on the instrumented path. The custom implementation of the libitm interface used in these experiments supports static linkage with the target executable, according to some embodiments.

One goal of these experiments was to compare a standard implementation of Transactional Lock Elision (TLE) with an implementation that makes use of power-mode transactions (referred to herein as PowerTLE), according to some embodiments.

According to some embodiments of PowerTLE, as used in these evaluations, two metalocks may be associated with each cache line accessed by a transaction: one for read access and another for write access. For example, power-mode transactions may be run without HTM, while regular transactions use HTM. In some embodiments, a power-mode transaction may acquire metalocks for the cache lines it accesses, according to the access mode desired (e.g., read or write) by writing a value into the metalock. A regular transaction may then read the values of metalocks corresponding to the cache lines it accesses and according to the access mode. The regular transaction may then abort if it finds a metalock locked (e.g., by power-mode transaction). Otherwise (e.g., it does not find a locked metalock), it may access the intended data. Note that this approach simulates power-mode semantics, according to some embodiments.

For example, any request by a regular (e.g., non-power-mode) transaction for data that is in use by a power-mode transaction is refused, causing that regular transaction to abort.

The implementation details of this evaluation approach may be illustrated by the pseudo-code shown below, according to some embodiments. For example, the example pseudo-code in lines 8-39 below illustrates the definition of metalocks and other auxiliary data structures used in this approach.

```
8   #define NUM_META_LOCKS (4 * 1024 * 1024)
9   #define CACHE_LINE_SIZE (64)
11  // fast pseudo-uniform hash function that maps a given key
12  // into a number between 0 and mask
13  int fast_hash(int key, int mask) { ... }
15  // These macros translate from an address to a
16  // read/write meta lock protecting the cache line
17  // where the address belongs to.
18  #define ADDR_TO_READ_LOCK(addr)         \
19      (&rMetadata[fast_hash(              \
20          addr~(CACHE_LINE_SIZE-1),       \
21          NUM_META_LOCKS-1)])
22  #define ADDR_TO_WRITE_LOCK(addr)        \
23      (&wMetadata[fast_hash(              \
24          addr&~(CACHE_LINE_SIZE-1),\
25          NUM_META_LOCKS-1)])
27  struct Lock {
28      TTS lock; // simple test -test-set lock
29      int seqNumber;
30      int rMetadata[NUM_META_LOCKS];
31      int wMetadata[NUM_META_LOCKS];
32      ...
33  } g_Lock;
35  struct ThreadInfo {
36      bool isPowerMode;
37      int localSeqNumber;
38      ...
39  }
```

The example pseudo-code in lines 41-71 below illustrates the read and write instrumentation barriers used to implement the libitm interface in this approach.

```
41  T read_barrier(void *addr) {
42      ThreadInfo *tx = getThreadInfo( );
43      if (! tx->isPowerMode) {
44          int seqNumber = tx->localSeqNumber;
45          if (*ADDR_TO_WRITE_LOCK(addr) >= seqNumber)
46              htm_abort( );
47      } else {
48          if (*ADDR_TO_READ_LOCK(addr) <
              g_Lock.seqNumber) {
49              *ADDR_TO_READ_LOCK(addr) =
                  g_Lock.seqNumber;
50              membarstoreload( );
51          }
52      }
53      return *addr;
54  }
56  void write_barrier (void *addr, T val ) {
57      ThreadInfo *tx = getThreadInfo( );
58      if (! tx->isPowerMode)) {
59          int seqNumber = tx->localSeqNumber;
60          if (*ADDR_TO_READ_LOCK(addr) >= seqNumber)
61              htm_abort( );
62          if (*ADDR_TO_WRITE_LOCK(addr) >= seqNumber)
63              htm_abort( );
64      } else {
65          if (*ADDR_TO_WRITE_LOCK(addr)<
              g_Lock.seqNumber)) {
67              *ADDR_TO_WRITE_LOCK(addr) =
                  g_Lock.seqNumber;
```

```
68        }
69      }
70      *addr = val;
71    }
```

In the example pseudo-code shown above, the mapping between an address (or more precisely, a cache line) and its corresponding metalocks uses a pseudo-uniform hash function, according to some embodiments. For the evaluations described herein, arrays of 4M words were used to represent metalocks (as shown in lines 30 and 31 of the example pseudo-code above) to reduce the chance that two cache lines will be mapped to the same metalock. Moreover, the use of large arrays and a pseudo-uniform hash function may result in the chance that two cache lines accessed in the same transaction were mapped into adjacent metalock words being negligible. Thus, in the example evaluations described herein, it may not be necessary to pad metalock words to avoid false sharing.

In the example pseudo-code shown above, entering power mode is protected by a simple test-and-test-and-set lock (at line 28) augmented with a sequence number (at line 29). The latter may be incremented after every lock acquisition (e.g., right after a transaction enters the power mode) and before lock release (e.g., right before a power-mode transaction commits). The sequence number, according to some embodiments, serves the purpose of efficient metalock release. Specifically, a regular transaction may store the current sequence number in a thread-local variable (the localSeqNumber within the ThreadInfo structure, at line 37) and may use this number to check whether the metalock is "locked" by a power-mode transaction (see lines 44 and 59). Thus, after the sequence number is incremented at the end of the power-mode transaction, any regular transaction that subsequently reads this number may deduce that all metalocks have been released.

In the example pseudo-code shown above, the power-mode transaction stores the current sequence number into corresponding metalock word (as in lines 49 and 67). An if-statement (e.g., at lines 48 and 66) may be used to check whether the store is actually required, such as to avoid writing the same value when the same cache line is accessed multiple times by a power-mode transaction. This optimization may, in some embodiments, be more important for the read barrier, which requires a store-load memory fence (at line 50) to ensure that the metalock update becomes visible to regular transactions before the power-mode transaction performs its read; otherwise, a power-mode transaction may read inconsistent data. Note that in total store order (TSO) architectures, such as in the processors used in these experiments, the store-load memory fence may not be required in the write barrier due to the total order on memory writes, according to some embodiments.

Note that in the read instrumentation barrier shown above, a regular transaction may access only the write metalock (at line 46), while in the write instrumentation barrier, it may access both the read and write metalocks (in lines 60-62). Thus, in some embodiments, a regular transaction may be able to share cache lines accessed by the power-mode transactions for read, but it may not acquire ownership of cache lines accessed by a power-mode transaction for read or for write, as required.

Note that one difference, according to some embodiments, between TLE and PowerTLE in the evaluations described herein may be the ability of power-mode transactions to run concurrently with regular transactions as long as those transactions do not actually conflict on shared data. The results achieved with two micro-benchmarks and with a widely-used benchmarking suite for transactional memory applications are illustrated in FIGS. 8A-C, 9A-C, 10A-C, 11A-C, and 12A-H, as will be described in more detail below.

Skip List-Based Priority Queue Example

Figure 8A:
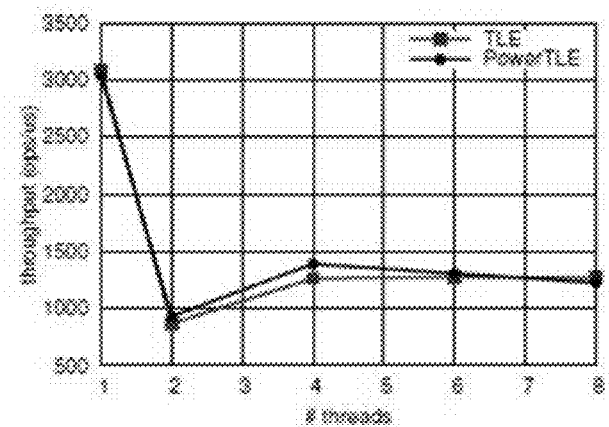
FIGS. 8A-8C illustrate results of experiments that emulate the use of power-mode transactions, according to various embodiments.
Figure 8B:
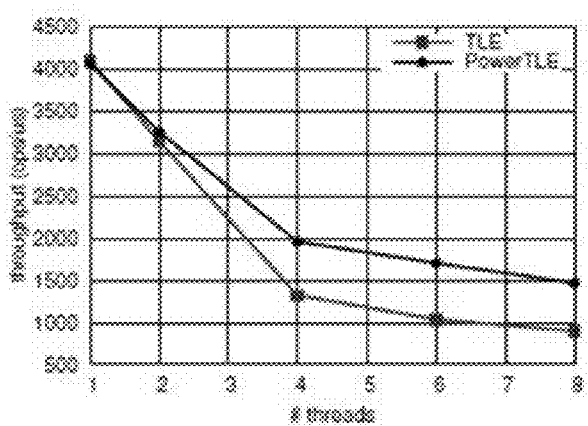
Figure 8C:
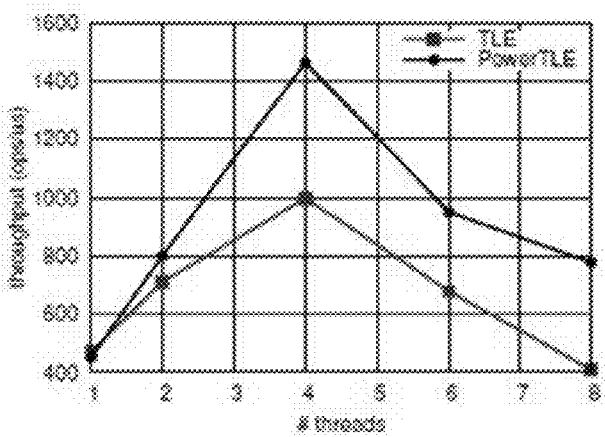
Figure 9A:
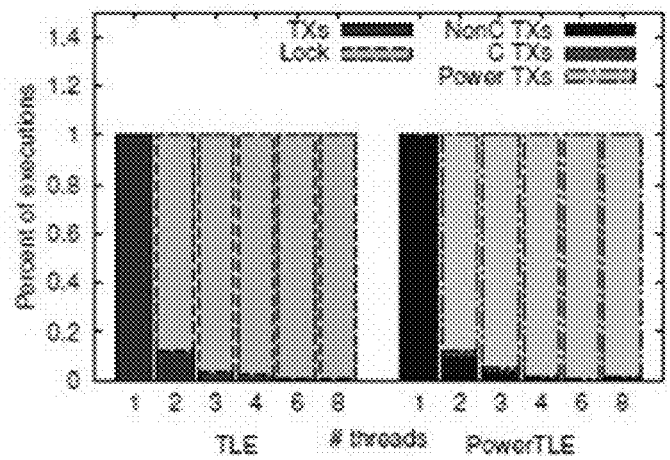
FIGS. 9A-9C and illustrate results of experiments that emulate the use of power-mode transactions, according to various embodiments.
Figure 9B:
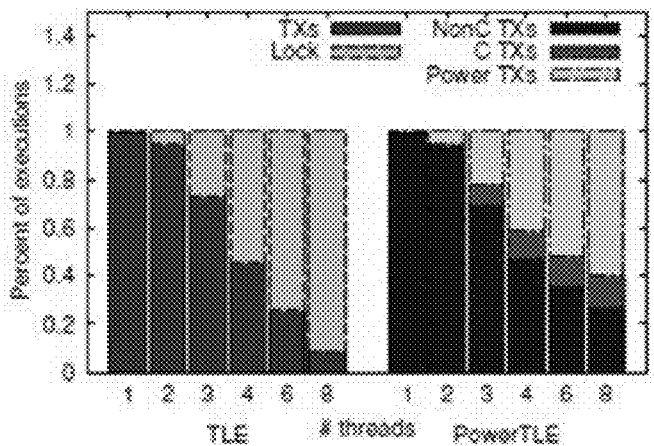
Figure 9C:
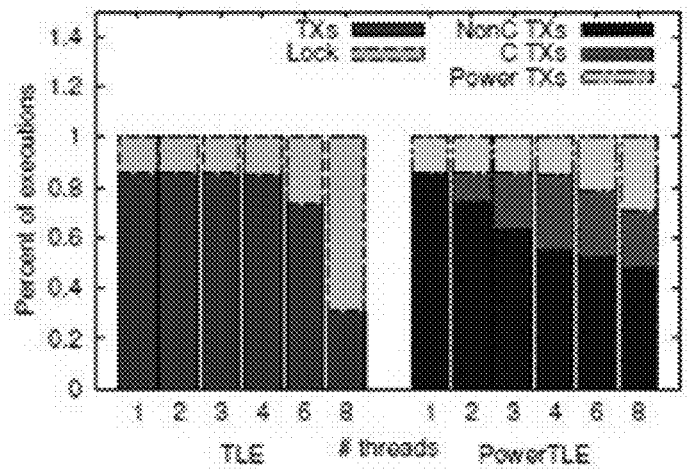

FIGS. 8A, 8B and 8C illustrate, according to one embodiment, throughput results of a priority queue micro-benchmark that uses a standard skip list implementation as an underlying data structure, according to the evaluation framework described above. The graphs in FIGS. 8A, 8B and 8C illustrate, according to one embodiment, the skip list-based priority queue throughput (i.e., a higher value indicates better performance). The breakdown of operations between different modes of executions (e.g., regular transactions, power-mode transactions, etc.) is presented in FIGS. 9A, 9B and 9C. Note that as illustrated in FIGS. 9A, 9B and 9C (and other figures), "C TXs" represents transactions executed concurrently with a power-mode transaction and "Non C TXs" represents transactions executed non-concurrently with any power-mode transactions). The results shown represent the average of five runs performed in the same configuration. Regular PowerTLE transactions that are completed without any power-mode transaction running concurrently with them are reported separately (in FIGS. 9A, 9B and 9C) from those completed while at least one power-mode transaction was running. This separation is made possible by comparing the sequence number stored in a thread local variable before the (regular) transaction is started and the sequence number stored in the lock structure when that transaction commits.

For the experiment illustrated in FIG. 8A, the queue was initialized with 50K elements, and all threads ran a total number of 50K RemoveMin operations, divided equally among the participating threads. The time was measured from the start until the last thread was finished with its operations, and throughput was calculated by dividing the total number of performed operations (50K) by this time. In this particular workload, all threads compete with each other over the minimal element in the queue. According to the embodiment illustrated in FIG. 8A, the use of power mode may not significantly increase throughput, since a power-mode transaction may conflict with every other regular transaction and thus abort them. Thus, as illustrated in FIG. 8A, few regular transactions may manage to complete, while the majority of operations are executed using a lock (in TLE) or power-mode transactions (in PowerTLE), according to one embodiment.

In the experiment illustrated in FIG. 8B, the queue was initialized with 50K elements, and each thread ran loop iterations for 5 seconds, where in each iteration it chooses randomly to remove a minimal element or insert a random element into the queue. As illustrated in FIG. 8B, the increased concurrency provided by power mode may begin to take effect as the number of threads increases. This may be because when a thread runs (e.g., via use of an Insert operation in power mode), other threads may proceed concurrently to apply their non-conflicting operations. As a result, at 8 threads, PowerTLE may achieve 50% more throughput than TLE, according to one example embodiment. FIG. 9B illustrates that some portion of regular transactions may manage to compete concurrently with a power-mode transaction, and this portion may grow with the number of threads, according to some embodiments. In some cases, the portion of regular transactions completing non-concurrently with a power-mode transaction may be larger for PowerTLE than the portion of transactions in TLE. This may be due to the decreased lemming effect that the power-mode transaction has comparing to lock, as the former does not abort all transactions but only those conflicting with it, according to some embodiments.

The gap between the portion of regular transactions completing non-concurrently with a power-mode transaction and the portion of transactions in TLE may increase even further when considering only Insert operations, which are less likely to conflict with each other than RemoveMin operations, in some embodiments. In the experiment illustrated in FIG. 8C, the queue was initially empty and all threads performed a total number of 50K insert operations, divided equally among threads. As illustrated in FIG. 8C, the improved concurrency of PowerTLE may allowed it to outperform TLE starting at just two threads, according to some embodiments. At 8 threads, PowerTLE may, in some embodiments, achieve twice the throughput of TLE. The potentially improved concurrency of PowerTLE may be evident from the increased portion of regular transactions executed while a power-mode transaction was running, as shown in FIG. 9C.

Results for AVL Tree-Based Sets

Figure 10A:
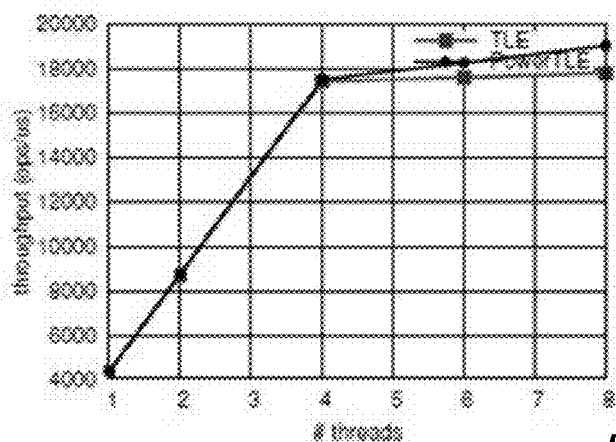
FIGS. 10A-10C and illustrate results of experiments that emulate the use of power-mode transactions, according to various embodiments.
Figure 10B:
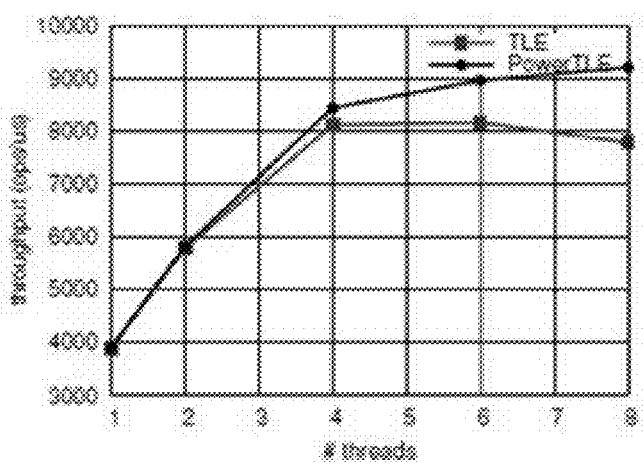
Figure 10C:
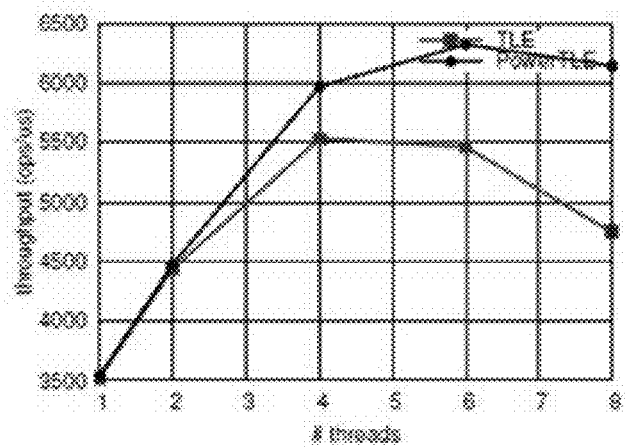

FIGS. 10A, 10B and 10C illustrate throughput results of a set micro-benchmark implemented on top of AVL trees, according to some embodiment. Each thread ran iterations for 5 seconds, and in each iteration it chose an operation and a key. The operations were randomly selected from a given workload distribution, while the key was randomly selected from a given range from 0 to 511. The set was initialized to contain half of the given key range (e.g., 256 keys).

Figure 11A:
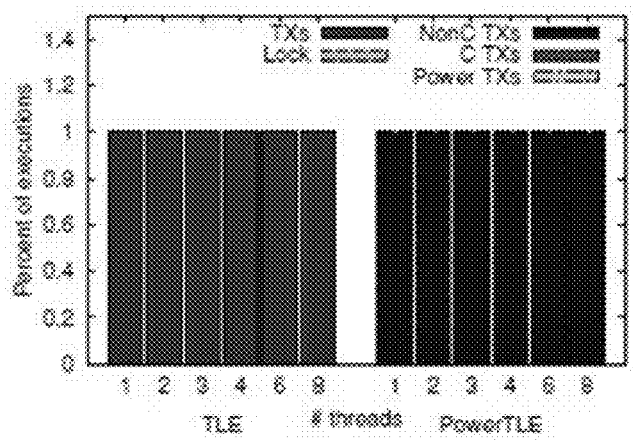
FIGS. 11A-11C and illustrate results of experiments that emulate the use of power-mode transactions, according to various embodiments.

FIG. 10A (a) shows results for the read only workload where all threads perform only Find operations. Here, for up to four threads, the vast majority of operations succeeded without any retries, and thus the power mode is not used. After four threads, some operations occasionally (but very rarely) experienced capacity failures due to hyper-threading. Those may represent transient failures, which in most cases were handled by retries. Thus, a small portion of transactions failed to the lock (in TLE) or entered power mode (in PowerTLE), as shown in FIG. 11A.

Figure 11B:
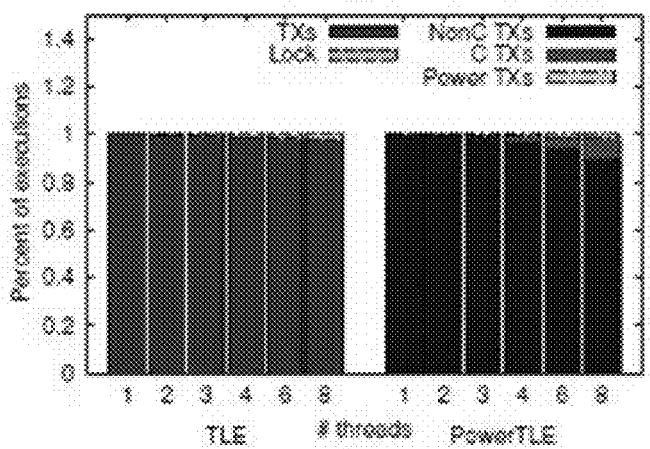
Figure 11C:
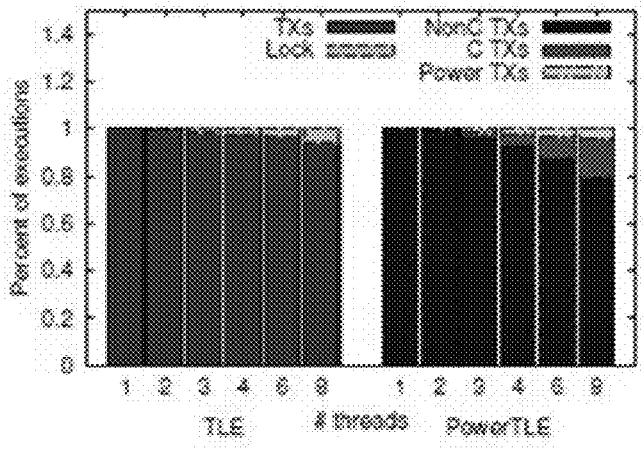
Figure 12A:
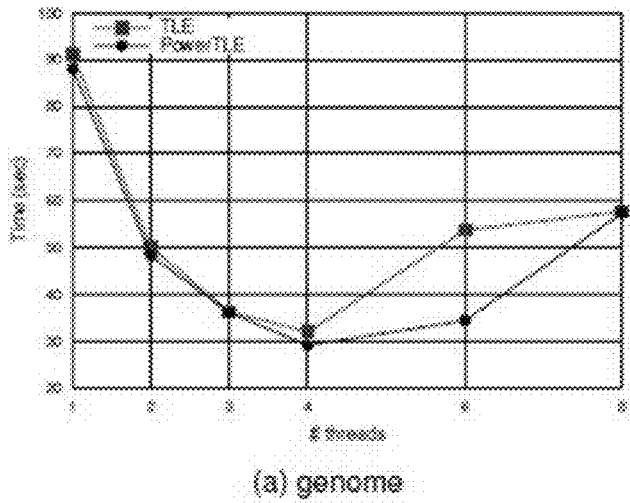
FIGS. 12A-12H and illustrate results of experiments that emulate the use of power-mode transactions, according to various embodiments.
Figure 12B:
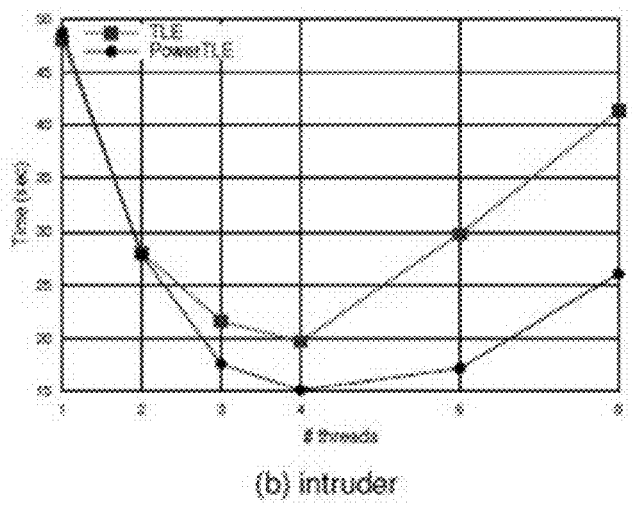
Figure 12C:
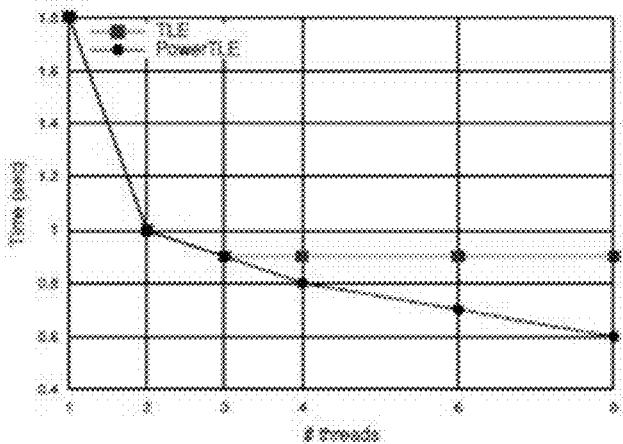
Figure 12D:
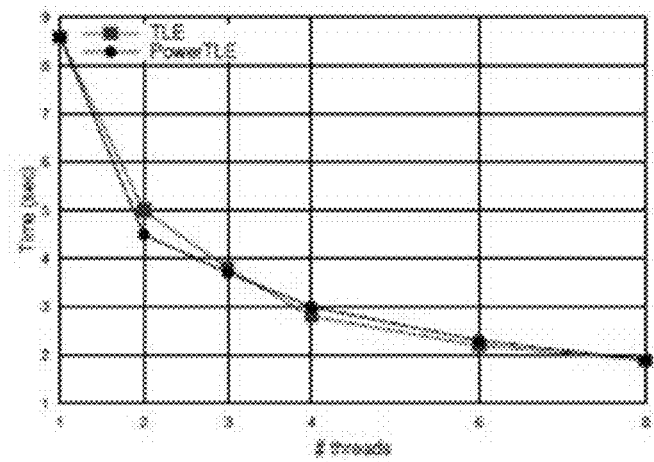
Figure 12E:
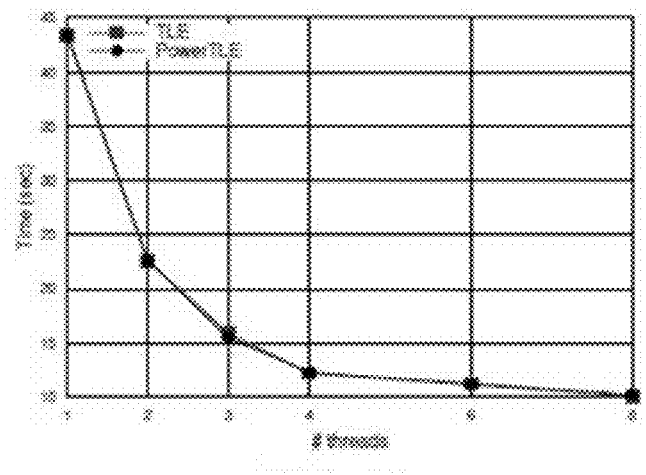
Figure 12F:
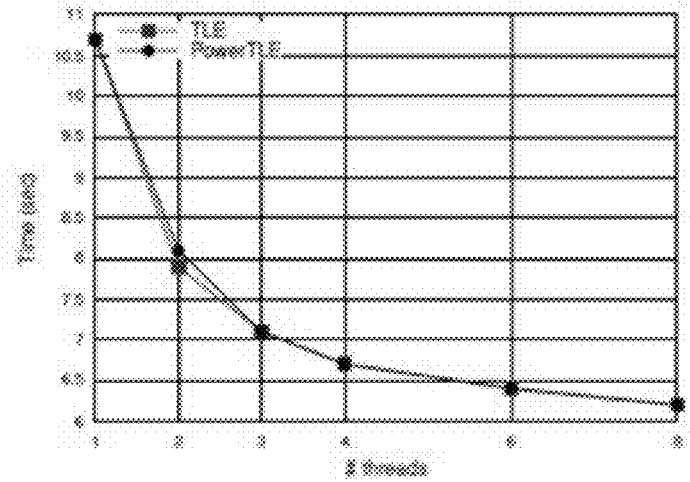
Figure 12G:
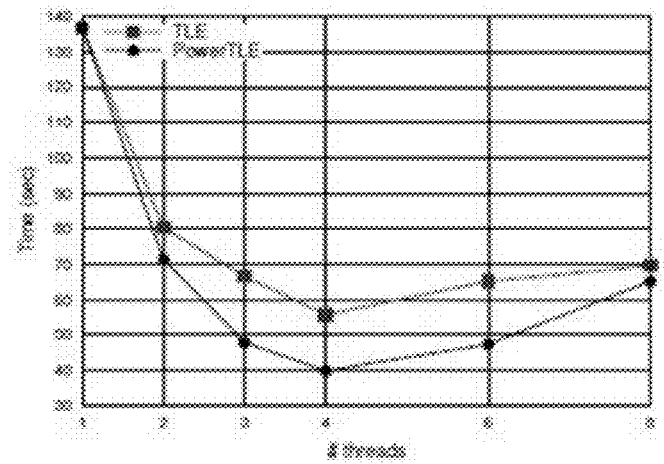
Figure 12H:
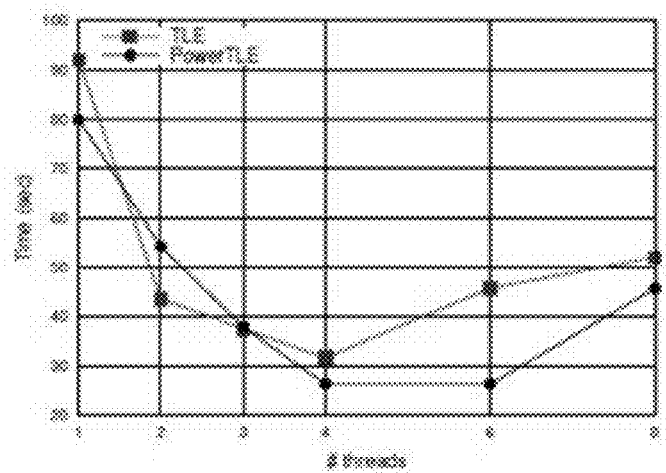

The workloads in FIGS. 10B and 10C include update operations, according to one embodiment. Specifically, FIG. 10B illustrates results for an experiment in which threads perform 60% Find operations, FIG. 10C illustrates threads performing 20% Find operations. The remainder was divided equally between Insert and Remove. As illustrated in FIGS. 10B and 10C, more transactions may, in some embodiments, fall back to the lock (e.g., in TLE) as they experience conflicts on data they access. As a result, the potential benefit of increased concurrency provided by PowerTLE may become more significant as the number of threads and/or the portion of update operations increases, according to various embodiments. The breakdown of execution modes for these workloads, as illustrated in FIGS. 11B and 11C, respectively, may, in some embodiments, confirm that as the number of threads increases, more transactions may manage to complete in PowerTLE concurrently with a power-mode transaction, rather than falling to the lock as they would with TLE.

Bench-Marking Results

This section presents results measured with a benchmarking suite. For each benchmark, a standard set of command line parameters was used. FIGS. 12A-12H illustrates running times reported by the benchmarks, averaged over five runs, where a smaller value indicates better performance, according to some embodiments.

As illustrated in FIGS. 12A-12H, power mode may never be harmful, and may be quite helpful in certain cases, according to various embodiments. In five cases, PowerTLE beat TLE by a substantial margin, in some embodiments. In cases where the TLE technique (e.g., without the power mode) does not scale, improved concurrency of PowerTLE may play a significant role.

Note that, in some embodiments, simulating a hardware power-mode implementation in software may have limitations. However, because instrumentation penalizes power-mode transactions more than regular transactions, these results may actually understate the benefits of a hardware power-mode implementation. The techniques described herein for simulating and charging for capacity aborts in power-mode transactions is an approximation of the real costs, which may also overestimate the penalties for such aborts.

Note that the experiments, evaluations and examples described herein, including those described above regarding FIGS. 8A-8C, 9A-9C, 10A-10C, 11A-11C and 12A-12H, represent only example implementations and/or embodiments of the methods, techniques and/or mechanisms described herein. The specific details and exact manner in which the methods, techniques and/or mechanisms described herein may vary from embodiment to embodiment.

ADDITIONAL REMARKS

Power-mode transactions may have some limitations in some embodiments. For example, in at least some embodiments power-mode transaction may require (relatively simple) hardware support, since, for example, the purely software power-mode implementation used in the evaluations described herein may add too much overhead to be practical by itself. In addition, in some embodiments, the use of power mode may not completely eliminate the need for lock elision or similar non-speculative fallback paths. In some cases, the compiler or the programmer may be able detect statically that a transaction is well-formed, and such transactions may not need a lock-based fallback path. Often, however, it may not be practical to make this determination, and such transactions may still require a fallback path. Nevertheless, even if a lock-based fallback path must be provided, power-mode transactions may take the fallback path less often, thereby creating more opportunity for concurrency.

Again note that, although the techniques for implementing power-mode transactions may be described herein primarily in terms of software implementations, in some embodiments, these techniques can be implemented entirely in hardware. For example, HTM hardware implementations may be extended to determine when to switch to power mode, to decide how many times to try regular hardware transactions, and/or to decide which core should switch into power mode when multiple threads are executing critical sections meeting well-formedness criteria, according to various embodiments.

Note that, in some embodiments, the techniques for implementing a power mode may be generalized to encompass multiple power mode levels, effectively providing a form of transactional priority system. In some embodiments, the use of multiple power mode levels may allow transactional programming to adapt to reactive systems. For instance, instead of merely providing an indication of power mode, the HTM may, in some embodiments, provide an indication of the power mode level (i.e., from among multiple levels). For example, in one embodiment, the HTM may implement a separate flag for each power mode priority level. Thus, instead of supporting only regular transactions and power mode transactions, the HTM may, in some embodiments, be extended to support, for example, multiple power mode tiers, such as a power mode tier 1, a power mode tier 2, and a power mode tier 3 (which may be the most powerful, in terms of priority, transaction), plus a regular hardware transaction mode. In this example, the "lock" procedure may climb up these tiers, if needed, in order to execute a given transaction. For example, the lock procedure may start with the thread in regular mode, try a few times, then try power mode tier 1, then tier 2, then tier 3 (which may guarantee progress), as needed. In some embodiments, a system may support a multi-tiered power mode fall back to a lock acquisition path if all else fails (e.g., in the case of an illegal power-mode conflict).

In some embodiments, an arbitration mechanism may be extended so that if a transaction receives an invalidation request from a transaction executing at a lower power mode level, the transaction executing at the higher power mode level denies the lower power level transaction, such as by sending back a NACK message. In some embodiments, multiple levels of power mode may be implemented in a manner such that multiple power-mode transactions operating at different power mode levels may all execute in power mode concurrently, assuming they access disjoint data sets (e.g., they touch different data). Additionally, in some embodiments, a thread executing at any particular power mode level may also deny invalidation requests only from transactions at lower power mode levels, but from non-transactional code as well, thereby potentially forcing the latter to back off and request the same cache line again. As noted previously, allowing a thread in power mode (whether utilizing a single or multiple power mode levels) to deny invalidation requests from both other transactions (e.g., both regular transactions and power-mode transactions executing at lower power mode levels) and non-transaction code may, in some embodiments, simplify the implementation of power mode and may increase the circumstances in which the progress of power-mode transactions may be guaranteed.

Figure 13:
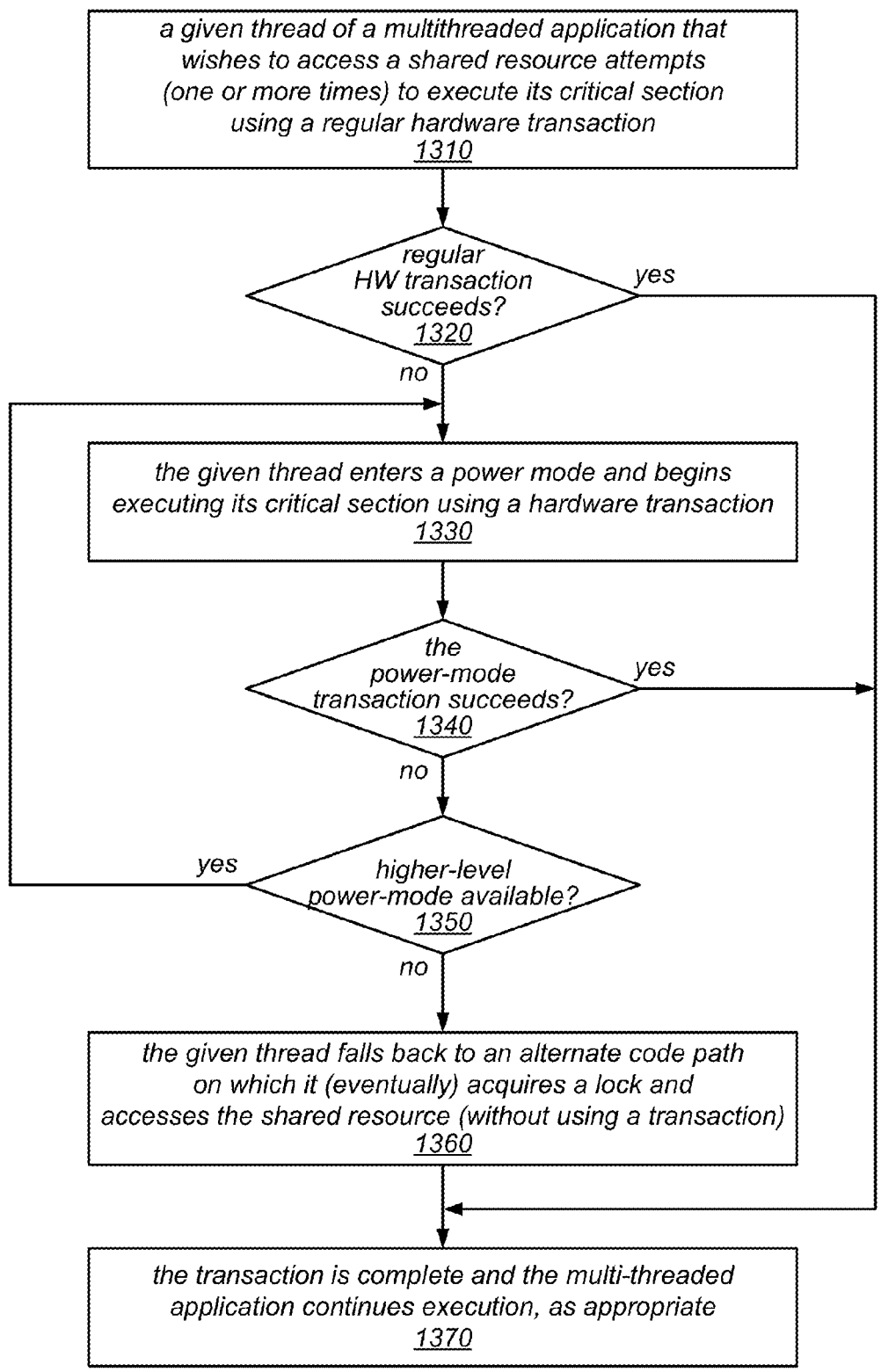
FIG. 13 is a flow diagram illustrating one embodiment of a method for utilizing power-mode transactions at multiple power-mode levels in a hardware transactional memory (HTM) system.

FIG. 13 is a flow diagram illustrating one embodiment of a method for utilizing power-mode transactions at multiple power-mode levels in a hardware transactional memory (HTM) system. Note that, in other embodiments, there may not be an alternate code path for these transactions that performs lock acquisition. Instead, if all power-mode transactions (including with the highest level power-mode transaction) fail, the HTM may abort the transactions and return an error code indicating an illegal power-mode conflict. As illustrated in block 1310, a given thread of a multithreaded application that requires access to a shared resource may attempt (one or more times) to execute its critical section using a regular (e.g., non-power-mode) hardware transaction. If the regular hardware transaction succeeds, as indicated by the positive output of decision block 1320, the transaction may be complete (or may be considered complete) and the multi-threaded application may continue execution as appropriate, as shown in block 1370.

If the regular hardware transaction does not succeed, as indicated by the negative output of decision block 1320, the given thread may enter a power-mode and may begin executing its critical section using a hardware transaction, as in block 1330. If the power-mode transaction succeeds, as indicated by the positive output of decision block 1340, the transaction may be considered complete and the multi-threaded application may continue execution as illustrated in block 1370. Alternatively, if the power-mode transaction does not succeed, as indicated by the negative output of decision block 1340, it may be determined whether a higher-level power mode is available, as in decision block 1350. If, as indicated by the positive output of decision block 1350, there is a higher-level power mode available, the given thread may enter a higher-level power mode and begin executing its critical section using a hardware transaction, as in block 1330. If, however, no higher-level power mode is available, as indicated by the negative output of decision block 1350, the given thread may fall back to an alternate code path on which it (eventually) acquires a lock and accesses the shared resource (without using a transaction), as in block 1360.

Computing System

Figure 14:
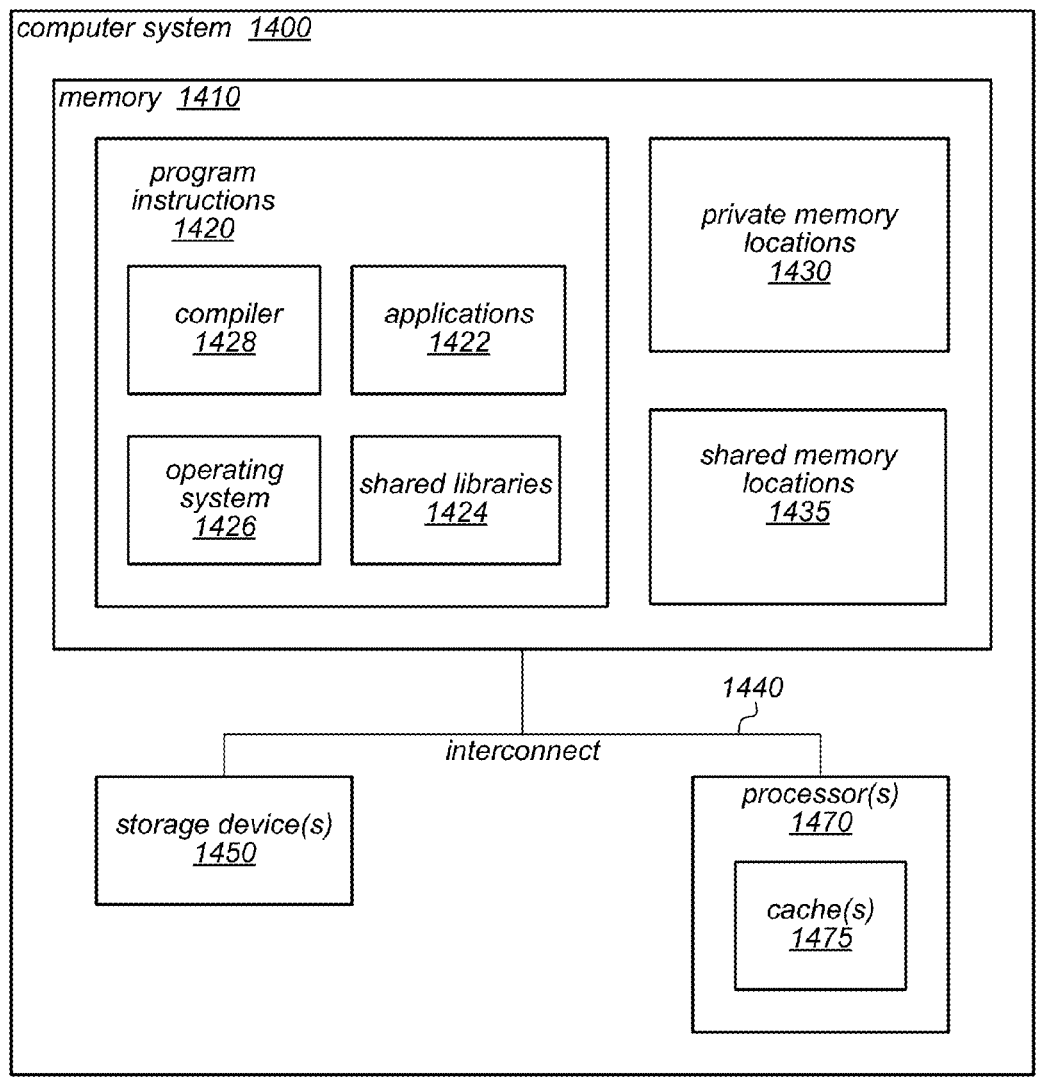
FIG. 14 is a block diagram illustrating one embodiment of a computing system that is configured to implement mechanisms that guarantee progress for hardware transactional memory, as described herein.

The techniques and methods described herein for guaranteeing progress for hardware transactional memory may be implemented on or by any of a variety of computing systems, in different embodiments. For example, FIG. 14 is a block diagram illustrating one embodiment of a computing system that is configured to implement such techniques and methods, as described herein, according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms for guaranteeing progress for hardware transactional memory, as described herein, may be provided as a computer program product, or software, that may include a non-transitory, computer-readable storage medium having stored thereon instructions, which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1470; each may include multiple cores, any of which may be single- or multi-threaded. For example, multiple processor cores may be included in a single processor chip (e.g., a single processor 1470), and multiple processor chips may be included in computer system 1400. Each of the processors 1470 may include a cache or a hierarchy of caches 1475, in various embodiments. For example, each processor chip 1470 may include multiple L1 caches (e.g., one per processor core) and one or more other caches (which may be shared by the processor cores on a single processor). In some embodiments, hardware support for HTM and/or for the power modes, as described herein, may be implemented within caches 1475 and/or within other components of processors 1470 or computer system 1400. The computer system 1400 may also include one or more storage devices 1450 (e.g. optical storage, magnetic storage, hard drive, tape drive, solid state memory, etc.) and one or more system memories 1410 (e.g., one or more of cache, SRAM, DRAM, RDRAM, EDO RAM, DDR 10 RAM, SDRAM, Rambus RAM, EEPROM, etc.). In some embodiments, one or more of the storage device(s) 1450 may be implemented as a module on a memory bus (e.g., on interconnect 1440) that is similar in form and/or function to a single in-line memory module (SIMM) or to a dual in-line memory module (DIMM). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1470, the storage device(s) 1450, and the system memory 1410 may be coupled to the system interconnect 1440. One or more of the system memories 1410 may contain program instructions 1420. Program instructions 1420 may be executable to implement one or more applications 1422 (which may include source code and/or executable code for a multithreaded application 110 that accesses shared resources, such as shared data 140), shared libraries 1424, transactional support library 130, and/or operating systems 1426. In some embodiments, program instructions 1420 may include a compiler 1428 and/or compiler 150 (which may be an optimizing compiler configured to determine which, if any, critical sections may be implemented using power-mode transactions). In some embodiments, program instructions 1420 may be executable to implement a contention manager (not shown). In some embodiments, program instructions 1420 (or more specifically, shared libraries 1424 which may include transaction support library 130) may include methods for guaranteeing progress for hardware transactional memory, or any other methods that may be invoked by applications 1422.

Program instructions 1420 may be encoded in platform native binary, any interpreted language such as Java™ byte-code, or in any other language such as C/C++, the Java™ programming language, etc., or in any combination thereof. In various embodiments, optimizing compiler 1428, applications 1422, operating system 1426, and/or shared libraries 1424 may each be implemented in any of various programming languages or methods. For example, in one embodiment, optimizing compiler 1428 and operating system 1426 may be based on the Java programming language, while in other embodiments they may be written using the C or C++ programming languages. Similarly, applications 1422 may be written using the Java programming language, C, C++, or another programming language, according to various embodiments. Moreover, in some embodiments, optimizing compiler 1428, applications 1422, operating system 1426, and/shared libraries 1424 may not be implemented using the same programming language. For example, applications 1422 may be C++ based, while optimizing compiler 1428 may be developed using C.

In some embodiments, the program instructions 1420 may include transactional memory support and/or other functions, operations, or procedures for implementing multithreaded applications that access shared resources, as described herein. Such support and functions may exist in one or more of the shared libraries 1424 (one of which may include transaction support library 130), operating systems 1426, or applications 1422, in various embodiments. The system memory 1410 may further comprise private memory locations 1430 and/or shared memory locations 1435 where data may be stored. For example, in some embodiments, shared memory locations 1435 (which may be implemented as a hardware transactional memory) may store state data, metadata, or other shared resources that are accessible to multiple, concurrently executing threads, processes, or transactions, in various embodiments. In some embodiments, private memory locations 1430 and/or shared memory locations 1435 may store thread-local flags, lock state information, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports HTM described herein are supported or implemented. It is intended that the following claims be interpreted to embrace all such variations and modifications.

What is claimed:

1. A method, comprising:
  performing by one or more computing nodes in a system that supports multithreading and implements a hardware transactional memory:
    executing a multithreaded application that comprises a plurality of critical sections targeting a shared resource, wherein the shared resource is accessible by a plurality of threads of the multithreaded application, wherein critical sections of the multithreaded application may be executed speculatively using regular hardware transactions, executed speculatively using power-mode hardware transactions, and executed non-transactionally, wherein power-mode transactions have a higher priority than regular hardware transactions;
    attempting to execute, by a given thread of the multithreaded application, a given critical section of the plurality of critical sections using a given power-mode hardware transaction;
    receiving, by the given power-mode hardware transaction, an invalidation request for data accessed by the given power-mode transaction to be accessed by another thread of the multithreaded application executing another of the plurality of critical sections;
    determining whether the other thread is executing the other critical section using a regular hardware transaction, a power-mode hardware transaction, or non-transactionally; and
    in response to determining that the other thread is executing the other critical section non-transactionally, continuing to execute the given power-mode hardware transaction without regard to the invalidation request and without invalidating the data accessed by the given power-mode transaction in response to receiving the invalidation request.

2. The method of claim 1, further comprising:
  attempting to execute, by the given thread prior to said attempting to execute the given critical section using the given power-mode transaction, the given critical section using a prior regular hardware transaction; and
wherein said attempting, by the given thread, to execute the given critical section using the given power-mode hardware transaction is performed, at least in part, in response to a failure to commit the prior regular hardware transaction.

3. The method of claim 1, further comprising:
in response to determining that the other thread is executing the other critical section using a regular transaction:
determining whether the regular hardware transaction conflicts with the given power-mode hardware transaction; and
continuing to execute the given power-mode hardware transaction without regard to the invalidation request and without invalidating the data accessed by the given power-mode transaction in response to receiving the invalidation request.

4. The method of claim 3, further comprising: in response to determining that the regular hardware transaction conflicts with the given power-mode hardware transaction, returning an indication that the regular hardware transaction should abort.

5. The method of claim 4, wherein said returning an indication that the regular hardware transaction should abort comprises returning a NACK identifier indicating a denial of access to the shared resource to the regular hardware transaction.

6. The method of claim 3, further comprising: in response to determining that the regular hardware transaction does not conflict with the given power-mode hardware transaction, continuing to execute both the regular hardware transaction and the given power-mode hardware transaction.

7. The method of claim 1, further comprising: attempting to execute, by another thread of the multithreaded application, another of the plurality of critical sections using another power-mode hardware transaction.

8. The method of claim 7, further comprising:
receiving, by the given power-mode hardware transaction, an invalidation request from the other power-mode hardware transaction for data accessed by the given power-mode transaction to be accessed by the other power-mode hardware transaction; and
in response to receiving the invalidation request from the other power-mode hardware transaction, aborting the given power-mode hardware transaction.

9. The method of claim 8, wherein said aborting the given power-mode hardware transaction comprises: aborting the given power-mode hardware transaction using an error code indicating an illegal power-mode conflict.

10. The method of claim 1, further comprising: implementing a transaction support library, wherein said attempting to execute is performed in response to invocation of a function within the transaction support library by program instructions that implement the one of the plurality of critical sections.

11. A non-transitory, computer-readable storage medium storing program instructions that when executed on one or more computers cause the one or more computers to perform:
executing, in a system that supports multithreading and implements a hardware transactional memory, a multithreaded application that comprises a plurality of critical sections targeting a shared resource, wherein the shared resource is accessible by a plurality of threads of the multithreaded application, wherein critical sections of the multithreaded application may be executed speculatively using regular hardware transactions, executed speculatively using power-mode hardware transactions, and executed non-transactionally, wherein power-mode transactions have a higher priority than regular hardware transactions;
attempting to execute, by a given thread of the multithreaded application, a given critical section of the plurality of critical sections using a given power-mode hardware transaction;
receiving, by the given power-mode hardware transaction, an invalidation request for data accessed by the given power-mode transaction to be accessed by another thread of the multithreaded application executing another of the plurality of critical sections; and
in response to determining that the other thread is executing the other critical section non-transactionally, denying the invalidation request, wherein said denying comprises continuing to execute the given power-mode hardware transaction without regard to the invalidation request and without invalidating the data accessed by the given power-mode transaction in response to receiving the invalidation request.

12. The non-transitory, computer-readable storage medium of claim 11,
wherein said receiving comprises receiving the invalidation request from a regular hardware transaction, wherein the regular hardware transaction executes another critical section of the plurality of critical sections using a hardware transaction that is not a power-mode hardware transaction, and
wherein in response to determining that the other thread is executing the other critical section using a regular transaction, continuing to execute the given power-mode hardware transaction without regard to the invalidation request and without invalidating the data accessed by the given power-mode transaction in response to receiving the invalidation request.

13. The non-transitory, computer-readable storage medium of claim 11, wherein the program instructions further cause the one or more computers to perform:
in response to determining that the other thread is executing the critical section using another power-mode hardware transaction, denying the invalidation request, wherein said denying comprises continuing to execute the given power-mode hardware transaction without regard to the invalidation request and without invalidating the data accessed by the given power-mode transaction in response to receiving the invalidation request,
wherein said receiving comprises receiving the invalidation request from the other power-mode hardware transaction, wherein both the given power-mode hardware transaction and the other power-mode hardware transaction are associated with respective levels of a plurality of power mode levels,
and wherein said denying is performed, at least in part, in response to determining that the given power-mode hardware transaction is associated with a higher-priority power mode level than the other power-mode hardware transaction.

14. The non-transitory, computer-readable storage medium of claim 11, wherein the program instructions further cause the one or more computers to perform:
attempting to execute, by another thread of the multithreaded application, another of the plurality of critical sections using another power-mode hardware transaction;

receiving, by the given power-mode hardware transaction, an invalidation request from the other power-mode hardware transaction for data accessed by the given power-mode transaction to be accessed by the other power-mode hardware transaction; and aborting the given power-mode hardware transaction in response to receiving the invalidation request from the other power-mode hardware transaction.

15. A system, comprising:

one or more processor cores;

a hardware transactional memory comprising shared data; and another memory coupled to the one or more processor cores;

wherein the other memory stores program instructions that when executed on the one or more processor cores cause the one or more processor cores to implement a multi-threaded application that comprises a plurality of critical sections targeting the shared data, wherein the shared data is accessible by a plurality of threads of the multithreaded application, wherein critical sections of the multithreaded application may be executed speculatively using regular hardware transactions, executed speculatively using power-mode hardware transactions, and executed non-transactionally, wherein power-mode transactions have a higher priority than regular hardware transactions; and wherein, to execute a given one of the plurality of critical sections on behalf of a given thread of the multi-threaded application, the hardware transactional memory is configured to:

attempt to execute the given critical section of the plurality of critical sections using a given power-mode hardware transaction;

receive an invalidation request for data accessed by the given power-mode transaction to be accessed by another thread of the multithreaded application executing another of the plurality of critical sections;

determine whether the other thread is executing the other critical section using a regular hardware transaction, a power-mode hardware transaction, or non-transactionally; and in response to determining that the other thread is executing the other critical section non-transactionally, continue to execute the given power-mode hardware transaction without regard to the invalidation request and without invalidating the data accessed by the given power-mode transaction in response to receiving the invalidation request.

16. The system of claim 15, wherein the hardware transactional memory is further configured to:

attempt to execute the given critical section using a prior regular hardware transaction; and wherein the attempt to execute the given critical section using the given power-mode hardware transaction is performed, at least in part, in response to a failure to commit the prior regular hardware transaction.

17. The system of claim 15, wherein the hardware transactional memory is further configured to:

in response to determining that the other thread is executing the other critical section using a regular transaction, continuing to execute the given power-mode hardware transaction without regard to the invalidation request and without invalidating the data accessed by the given power-mode transaction in response to receiving the invalidation request; and return, to the regular hardware transaction in response to determining that the regular hardware transaction conflicts with the given power-mode hardware transaction, an indication that the regular hardware transaction should abort.

18. The system of claim 15, wherein the hardware transactional memory is further configured to:

in response to determining that the other thread is executing the other critical section using a regular transaction, continuing to execute the given power-mode hardware transaction without regard to the invalidation request and without invalidating the data accessed by the given power-mode transaction in response to receiving the invalidation request; and continue to execute both the regular hardware transaction and the given power-mode hardware transaction in response to determining that the regular hardware transaction does not conflict with the given power-mode hardware transaction.

19. The system of claim 15, wherein the hardware transactional memory is further configured to:

attempt to execute, on behalf of another thread of the multithreaded application, another of the plurality of critical sections using another power-mode hardware transaction;

receive an invalidation request from the other power-mode hardware transaction for data accessed by the given power-mode transaction to be accessed by the other power-mode hardware transaction; and abort the given power-mode hardware transaction in response to receiving the invalidation request from the other power-mode hardware transaction.

* * * * *